United States Patent
Hoya et al.

(10) Patent No.: US 8,470,449 B2
(45) Date of Patent: Jun. 25, 2013

(54) PROPYLENE-BASED POLYMER COMPOSITION

(75) Inventors: Hiroshi Hoya, Chiba (JP); Koji Matsunaga, Yokohama (JP); Yoji Hayakawa, Chiba (JP); Kunihiko Mizumoto, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 339 days.

(21) Appl. No.: 12/735,263

(22) PCT Filed: Dec. 23, 2008

(86) PCT No.: PCT/JP2008/073364
§ 371 (c)(1),
(2), (4) Date: Jun. 25, 2010

(87) PCT Pub. No.: WO2009/084517
PCT Pub. Date: Jul. 9, 2009

(65) Prior Publication Data
US 2010/0285325 A1   Nov. 11, 2010

(30) Foreign Application Priority Data

Dec. 27, 2007  (JP) .................... 2007-336969
Feb. 8, 2008   (JP) .................... 2008-029130

(51) Int. Cl.
  *B32B 27/08*  (2006.01)
  *C08L 23/00*  (2006.01)

(52) U.S. Cl.
  USPC .......................... 428/516; 525/240

(58) Field of Classification Search
  None
  See application file for complete search history.

(56) References Cited

U.S. PATENT DOCUMENTS

| 7,488,789 | B2 | 2/2009 | Ikenaga et al. |
| 2006/0247381 | A1 | 11/2006 | Mori et al. |
| 2007/0251572 | A1* | 11/2007 | Hoya et al. ................... 136/256 |
| 2008/0085977 | A1 | 4/2008 | Okamoto et al. |

FOREIGN PATENT DOCUMENTS

| EP | 1 630 197 A1 | 3/2006 |
| EP | 1 820 821 A1 | 8/2007 |
| EP | 1 860 149 A1 | 11/2007 |
| JP | 09-309982 | 12/1997 |
| JP | 3344842 | 8/2002 |
| JP | 2007-186664 | 7/2007 |
| JP | 2007-186665 | 7/2007 |
| WO | WO-2004/008775 A1 | 10/2004 |
| WO | WO-2004/087775 A1 | 10/2004 |
| WO | WO-2004/106430 A1 | 12/2004 |

OTHER PUBLICATIONS

International Search Report in PCT/JP2008/073364 dated Mar. 24, 2009.
Communication (Supplementary EP Search Report) in EP Appln No. 08 86 9091 dated May 31, 2011.

* cited by examiner

*Primary Examiner* — Sheeba Ahmed
(74) *Attorney, Agent, or Firm* — Foley & Lardner LLP

(57) ABSTRACT

It is an object of the present invention to provide a propylene-based polymer composition which is excellent in transparency and heat resistance (particularly, heat resistance at high heat deformation temperature) and is free from occurrence of stickiness even when it is used at a high temperature for a long period of time. The propylene-based polymer composition of the invention comprises (A) a propylene-based polymer (PP) satisfying the following requirements (1) and (2), in an amount of 1 to 99 parts by weight, and (B) a propylene/ethylene/α-olefin copolymer satisfying the following requirements (I) to (IV), in an amount of 99 to 1 part by weight, with the proviso that the total amount of the component (A) and the component (B) is 100 parts by weight; (1) the polymer (A) has a melting point (Tm), as measured by a differential scanning calorimeter (DSC), of not lower than 110° C. but not higher than 170° C., (2) the polymer (A) has an isotactic pentad fraction (mmmm fraction) of not less than 90%, (I) the copolymer (B) contains constitutional units derived from propylene in amounts of 73.1 to 87.0% by mol, constitutional units derived from ethylene in amounts of 10.0 to 16.9% by mol and constitutional units derived from an α-olefin of 4 to 20 carbon atoms in amounts of 3.0 to 10.0% by mol, (II) the copolymer (B) has an isotactic triad fraction (mm), as calculated by $^{13}$C-NMR, of not less than 85%, and (III) the copolymer (B) has a molecular weight distribution (Mw/Mn, Mw: weight-average molecular weight, Mn: number-average molecular weight, both being in terms of polystyrene), as measured by gel permeation chromatography (GPC), of not more than 3.5.

15 Claims, 5 Drawing Sheets

PROPYLENE-BASED POLYMER COMPOSITION

TECHNICAL FIELD

The present invention relates to a propylene-based polymer composition comprising a propylene-based polymer and a propylene/ethylene/α-olefin copolymer of specific composition. More particularly, the invention relates to a propylene-based polymer composition (X0) which is excellent in transparency and heat resistance, and still more particularly, the invention relates to a propylene-based polymer composition (X1) which is excellent in flexibility, transparency and heat resistance, a propylene-based polymer composition (X2) which is excellent in transparency, mar resistance, whitening resistance and heat resistance, and a propylene-based polymer composition (X3) which is inhibited from staining an adherend over a long period of time and is excellent in transparency and heat resistance.

BACKGROUND ART

As soft materials composed of polyolefins which are excellent in flexibility, heat resistance and transparency and have environmental suitability and hygienic qualities, propylene-based elastomers containing propylene as a main component are known in recent years (see, for example, patent documents 1, 2 and 3).

Although the range of uses of such propylene-based elastomers is increasing at present, performance of propylene-based elastomers obtained in the prior art is not satisfactory, and further improvements in the aforesaid properties, such as flexibility, heat resistance and transparency, have been desired. Particularly in the prior art, practical heat resistance is insufficient, and therefore, there occurs a problem that surface stickiness develops when such elastomers are exposed to high temperatures for a long period of time.

Moreover, resin compositions containing polypropylene as a main component and their products have been applied to uses of a wide range, such as electric/electronic equipment parts, industrial materials, furniture, stationary, daily necessaries/miscellaneous goods, containers/packaging materials, toys, leisure goods, and medical supplies. On the other hand, there are known techniques for adding various flexibilizing materials in order to improve flexibility and impact resistance of the resin compositions containing polypropylene as a main component and their products, and it is known that by the use of a propylene-based polymer composition comprising the aforesaid propylene/ethylene/α-olefin copolymer of specific composition as an additive, flexibility, transparency, impact resistance, whitening resistance, etc. of the polypropylene resin compositions and their products can be improved (see patent documents 2 and 4).

Even in these techniques, however, the improvements are not satisfactory occasionally, and for example, an evil of occurrence of surface stickiness on exposure to high temperatures for a long period of time has been found similarly to the aforesaid case.

Patent document 1: International Publication No. WO2004/106430 A1
Patent document 2: Japanese Patent laid-Open Publication No. 186664/2007
Patent document 3: Japanese Patent laid-Open Publication No. 309982/1997
Patent document 4: Japanese Patent No. 3344842

DISCLOSURE OF THE INVENTION

Problem to be Solved by the Invention

The present invention is intended to solve such problems associated with the prior art as described above, and it is an object of the invention to provide a propylene-based polymer composition (X0) which is excellent in transparency and heat resistance (particularly, heat resistance at high heat deformation temperature) and is free from occurrence of stickiness even if it is used at a high temperature for a long period of time, a propylene-based polymer composition (X1) which is excellent in flexibility, transparency and heat resistance (particularly, heat resistance at high heat deformation temperature) and is free from occurrence of stickiness even if it is used at a high temperature for a long period of time, a propylene-based polymer composition (X2) which is excellent in transparency, mar resistance, whitening resistance and heat resistance and is free from occurrence of stickiness even if it is used at a high temperature for a long period of time, and a propylene-based polymer composition (X3) which is inhibited from staining an adherend over a long period of time, is excellent in transparency and heat resistance (particularly, heat resistance at high heat deformation temperature), is free from occurrence of stickiness even if it is used at a high temperature for a long period of time and is favorable particularly for a protective film.

Means to Solve the Problem

The propylene-based polymer composition (X0) of the present invention comprises (A) a propylene-based polymer (PP) satisfying the following requirements (1) and (2), in an amount of 1 to 99 parts by weight, and (B) a propylene/ethylene/α-olefin copolymer satisfying the following requirements (I) to (III), in an amount of 99 to 1 part by weight, with the proviso that the total amount of the component (A) and the component (B) is 100 parts by weight.

(1) The polymer (A) has a melting point (Tm), as measured by a differential scanning calorimeter (DSC), of not lower than 110° C. but not higher than 170° C.

(2) The polymer (A) has an isotactic pentad fraction (mmmm fraction) of not less than 90%.

(I) The copolymer (B) contains constitutional units derived from propylene in amounts of 73.1 to 87.0% by mol, constitutional units derived from ethylene in amounts of 10.0 to 16.9% by mol and constitutional units derived from an α-olefin of 4 to 20 carbon atoms in amounts of 3.0 to 10.0% by mol.

(II) The copolymer (B) has an isotactic triad fraction (mm), as calculated by $^{13}$C-NMR, of not less than 85%.

(III) The copolymer (B) has a molecular weight distribution (Mw/Mn, Mw: weight-average molecular weight, Mn: number-average molecular weight, both being in terms of polystyrene), as measured by gel permeation chromatography (GPC), of not more than 3.5.

The propylene-based polymer composition (X1) of the present invention comprises (A) a propylene-based polymer (PP) satisfying the following requirements (1) and (2), in an amount of 1 to 30 parts by weight, and (B) a propylene/ethylene/α-olefin copolymer satisfying the following requirements (I) to (III), in an amount of 70 to 99 parts by weight, with the proviso that the total amount of the component (A) and the component (B) is 100 parts by weight.

(1) The polymer (A) has a melting point (Tm), as measured by a differential scanning calorimeter (DSC), of not lower than 110° C. but not higher than 170° C.

(2) The polymer (A) has an isotactic pentad fraction (mmmm fraction) of not less than 90%.

(I) The copolymer (B) contains constitutional units derived from propylene in amounts of 73.1 to 83.0% by mol, constitutional units derived from ethylene in amounts of 14.0 to 16.9% by mol and constitutional units derived from an α-olefin of 4 to 20 carbon atoms in amounts of 3.0 to 10.0% by mol.

(II) The copolymer (B) has an isotactic triad fraction (mm), as calculated by $^{13}$C-NMR, of not less than 85%.

(III) The copolymer (B) has a molecular weight distribution (Mw/Mn, Mw: weight-average molecular weight, Mn: number-average molecular weight, both being in terms of polystyrene), as measured by gel permeation chromatography (GPC), of not more than 3.5.

The propylene-based polymer composition (X2) of the present invention comprises (A) a propylene-based polymer (PP) satisfying the following requirements (1) and (2), in an amount of 99 to 31 parts by weight, and (B) a propylene/ethylene/α-olefin copolymer satisfying the following requirements (I) to (III), in an amount of 1 to 69 parts by weight, with the proviso that the total amount of the component (A) and the component (B) is 100 parts by weight.

(1) The polymer (A) has a melting point (Tm), as measured by a differential scanning calorimeter (DSC), of not lower than 110° C. but not higher than 170° C.

(2) The polymer (A) has an isotactic pentad fraction (mmmm fraction) of not less than 90%.

(I) The copolymer (B) contains constitutional units derived from propylene in amounts of 73.1 to 83.0% by mol, constitutional units derived from ethylene in amounts of 14.0 to 16.9% by mol and constitutional units derived from an α-olefin of 4 to 20 carbon atoms in amounts of 3.0 to 10.0% by mol.

(II) The copolymer (B) has an isotactic triad fraction (mm), as calculated by $^{13}$C-NMR, of not less than 85%.

(III) The copolymer (B) has a molecular weight distribution (Mw/Mn, Mw: weight-average molecular weight, Mn: number-average molecular weight, both being in terms of polystyrene), as measured by gel permeation chromatography (GPC), of not more than 3.5.

In the propylene-based polymer composition (X0), the propylene-based polymer composition (X1) and the propylene-based polymer composition (X2), it is also preferable that (IV) the propylene/ethylene/α-olefin copolymer (B) has a B value, as defined by the following formula [1], of not less than 0.8 but not more than 1.3.

[Formula 1]
$$B = \frac{M_{OE}}{2M_O \cdot M_E} \quad [1]$$

wherein $M_{OE}$ is a molar fraction of the total of propylene-ethylene sequences and α-olefin of 4 or more carbon atoms-ethylene sequences to all the dyads, $M_O$ is the total of a molar fraction of propylene and a molar fraction of an α-olefin of 4 or more carbon atoms, and $M_E$ is a molar fraction of ethylene.

In the propylene-based polymer composition (X1) and the propylene-based polymer composition (X2), it is also preferable that (V) the propylene/ethylene/α-olefin copolymer (B) is a copolymer which has a melting point (Tm), as measured by a differential scanning calorimeter (DSC), of lower than 65° C. or whose melting point (Tm) is not observed.

In the propylene-based polymer composition (X1) and the propylene-based polymer composition (X2), it is also preferable that (VI) the propylene/ethylene/α-olefin copolymer (B) is a copolymer having a glass transition temperature (Tg), as measured by a differential scanning calorimeter (DSC), of −40 to −10° C.

In the propylene-based polymer composition (X1) and the propylene-based polymer composition (X2), it is also preferable that (VII) the propylene/ethylene/α-olefin copolymer (B) has a Shore A hardness, as measured in accordance with ASTM D2240, of 60 to 88.

With regard to the propylene-based polymer composition (X1), it is also preferable that a pressed sheet specimen having a thickness of 2 mm obtained from the propylene-based polymer composition (X1) has an internal haze of less than 15%.

It is also preferable that the propylene-based polymer composition (X1) has a Shore A hardness, as measured in accordance with ASTM D2240, of 70 to 92.

With regard to the propylene-based polymer composition (X1) and the propylene-based polymer composition (X2), it is also preferable that when a slice obtained from a core portion of a sheet having a thickness of 2 mm obtained by press molding the propylene-based polymer composition (X1) or the propylene-based polymer composition (X2) is dyed with ruthenic acid and observed by a transmission electron microscope (TEM), a phase separation structure is not observed.

With regard to the propylene-based polymer composition (X1), it is also preferable that one or more elastomers selected from the group consisting of a styrene/diene-based copolymer, a hydrogenation product thereof and a styrene/isobutylene copolymer have been added in amounts of 5 to 400 parts by weight based on 100 parts by weight of the propylene-based polymer composition (X1).

With regard to the propylene-based polymer composition (X2), it is also preferable that the total light transmittance (I(X2)) of a pressed sheet specimen having a thickness of 2 mm obtained from the propylene-based polymer composition (X2) and the total light transmittance (I(A)) of the propylene-based polymer (PP) (A) alone contained in the propylene-based polymer composition (X2) satisfy the following formula [2]:

$$I(X2) > I(A) \quad [2]$$

The propylene-based polymer composition (X3) of the present invention comprises (A) a propylene-based polymer (PP) satisfying the following requirements (1) and (2), in an amount of 1 to 30 parts by weight, and (B) a propylene/ethylene/α-olefin copolymer satisfying the following requirements (I) to (III), in an amount of 70 to 99 parts by weight, with the proviso that the total amount of the component (A) and the component (B) is 100 parts by weight.

(1) The polymer (A) has a melting point (Tm), as measured by a differential scanning calorimeter (DSC), of not lower than 110° C. but not higher than 170° C.

(2) The polymer (A) has an isotactic pentad fraction (mmmm fraction) of not less than 90%.

(I) The copolymer (B) contains constitutional units derived from propylene in amounts of 76.0 to 87.0% by mol, constitutional units derived from ethylene in amounts of 10.0 to 14.0% by mol and constitutional units derived from an α-olefin of 4 to 20 carbon atoms in amounts of 3.0 to 10.0% by mol.

(II) The copolymer (B) has an isotactic triad fraction (mm), as calculated by $^{13}$C-NMR, of not less than 85%.

(III) The copolymer (B) has a molecular weight distribution (Mw/Mn, Mw: weight-average molecular weight, Mn: number-average molecular weight, both being in terms of polystyrene), as measured by gel permeation chromatography (GPC), of not more than 3.5.

In the propylene-based polymer composition (X3), it is also preferable that (IV) the propylene/ethylene/α-olefin copolymer (B) has a B value, as defined by the aforesaid formula [1], of not less than 0.8 but not more than 1.3.

In the propylene-based polymer composition (X3), it is also preferable that (V) the propylene/ethylene/α-olefin copolymer (B) has a melting point (Tm), as measured by a differential scanning calorimeter (DSC), of lower than 80° C.

In the propylene-based polymer composition (X3), it is also preferable that (VI) the propylene/ethylene/α-olefin copolymer (B) is a copolymer having a glass transition temperature (Tg), as measured by a differential scanning calorimeter (DSC), of −40 to −10° C.

In the propylene-based polymer composition (X3), it is also preferable that (VII) the propylene/ethylene/α-olefin copolymer (B) has a Shore A hardness, as measured in accordance with ASTM D2240, of 83 to 98.

With regard to the propylene-based polymer composition (X3), it is also preferable that when a slice obtained from a core portion of a sheet having a thickness of 2 mm obtained by press molding the propylene-based polymer composition (X3) is dyed with ruthenic acid and observed by a transmission electron microscope (TEM), a phase separation structure is not observed.

With regard to the propylene-based polymer composition (X3), it is also preferable that one or more elastomers selected from the group consisting of a styrene/diene-based copolymer, a hydrogenation product thereof and a styrene/isobutylene copolymer have been added in amounts of 5 to 400 parts by weight based on 100 parts by weight of the propylene-based polymer composition (X3).

The adhesive of the present invention comprises the propylene-based polymer composition (X1) or the propylene-based polymer composition (X3).

The protective film of the present invention comprises a substrate containing at least one resin selected from the group consisting of polypropylene and polyethylene and an adhesive layer which contains the adhesive comprising the propylene-based polymer composition (X1) or the adhesive comprising the propylene-based polymer composition (X3) and is laminated on the substrate.

The sheet for keypad of the present invention comprises any one of the propylene-based polymer composition (X1), the propylene-based polymer composition (X2) and the propylene-based polymer composition (X3).

Effect of the Invention

The propylene-based polymer composition (X0) of the present invention is excellent in transparency and heat resistance (particularly, heat resistance at high heat deformation temperature) and is free from occurrence of stickiness even if it is used at a high temperature for a long period of time, and therefore, it can be broadly used for automotive interior trim parts, automotive exterior trim parts, electrical appliance parts, civil engineering/building material parts, packaging materials, sealing materials, adhesives, daily necessaries/industrial materials, medical supplies, clothing materials, optical materials, toys, leisure goods, etc.

The propylene-based polymer composition (X1) of the present invention is excellent in flexibility, transparency and heat resistance (particularly, heat resistance at high heat deformation temperature) and is free from occurrence of stickiness even if it is used at a high temperature, and therefore, a propylene-based elastomer employable under the temperature conditions of a wide range can be realized.

The propylene-based polymer composition (X2) of the present invention is excellent in transparency, mar resistance, whitening resistance and heat resistance and is free from occurrence of stickiness even if it is used at a high temperature, and therefore, it can be applied to polypropylene products employable under the temperature conditions of a wide range.

The propylene-based polymer composition (X3) of the present invention is inhibited from staining an adherend over a long period of time, is excellent in transparency and heat resistance (particularly, heat resistance at high heat deformation temperature) and is free from occurrence of stickiness even if it is used at a high temperature for a long period of time, and therefore, it is favorably used for, for example, a protective film.

When the propylene-based polymer composition of the invention is used as an additive for polypropylene products, flexibility, impact resistance, transparency, whitening resistance, etc. can be improved.

BEST MODE FOR CARRYING OUT THE INVENTION

Figure 1:
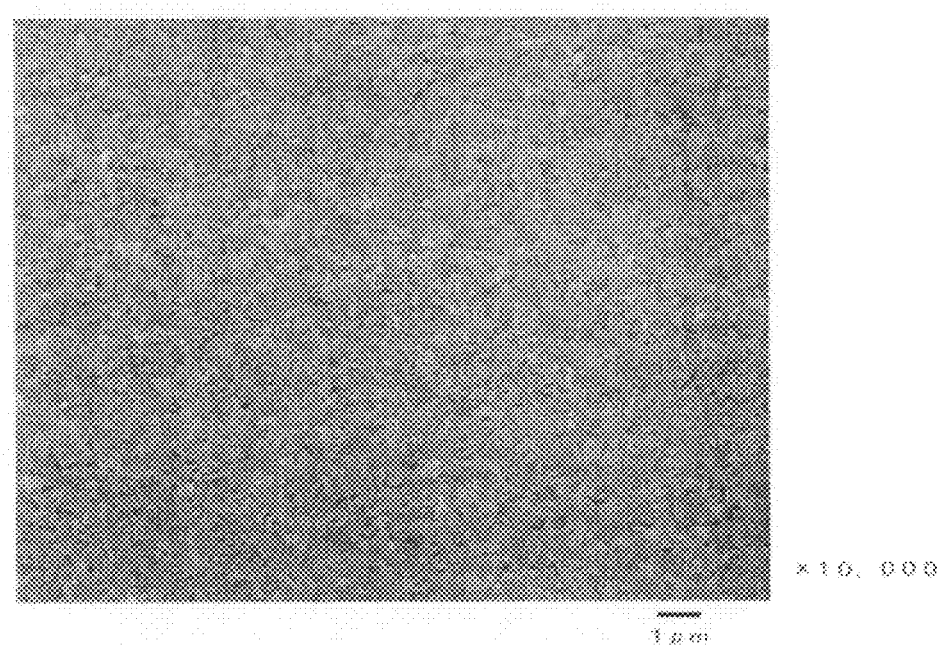
FIG. 1 shows a TEM image obtained by magnifying a propylene-based polymer composition described in Example 2 10000 times with TEM.

The present invention is described in detail hereinafter.

(A) Propylene-Based Polymer (PP)

The propylene-based polymer (PP) (A) for use in the invention may be homopolypropylene, may be a random copolymer of propylene and an α-olefin of 2 to 20 carbon atoms (except propylene) or may be a propylene block copolymer, but it is preferably homopolypropylene or a random copolymer of propylene and an α-olefin of 2 to 20 carbon-atoms.

From the viewpoints of heat resistance and rigidity of the resulting composition, homopolypropylene is particularly preferable, and from the viewpoints of flexibility and transparency of the resulting composition, a random copolymer of propylene and an α-olefin of 2 to 20 carbon atoms is particularly preferable.

Examples of the α-olefins of 2 to 20 carbon atoms other than propylene include ethylene, 1-butene, 1-pentene, 3-methyl-1-butene, 1-hexene, 4-methyl-1-pentene, 1-octene, 1-decene, 1-dodecene, 1-tetradecene, 1-hexadecene, 1-octadecene and 1-eicosene A copolymer of propylene and ethylene, a copolymer of propylene and an α-olefin of 4 to 10 carbon atoms or a copolymer of propylene, ethylene and an α-olefin of 4 to 10 carbon atoms is preferable.

The constitutional units derived from propylene are usually contained in amounts of not less than 90% by mol based on 100% by mol of the total of the constitutional units derived from propylene and the constitutional units derived from an α-olefin of 2 to 20 carbon atoms other than propylene.

The propylene-based polymer (PP) (A) for use in the invention is preferably an isotactic propylene-based polymer.

The isotactic propylene-based polymer is a propylene-based polymer having an isotactic pentad fraction, as measured by NMR method, of not less than 90%, preferably not less than 95%.

The isotactic pentad fraction (mmmm fraction) indicates a proportion of isotactic sequences of pentad units present in molecular chains, as measured by the use of $^{13}$C-NMR, and is a fraction of propylene monomer units each of which is present at the center of a sequence consisting of continuously meso-bonded 5 propylene monomer units.

More specifically, the isotactic pentad fraction is a value calculated as a fraction of mmmm peaks in all the absorption peaks in the methyl carbon region observed in a $^{13}$C-NMR spectrum.

This isotactic pentad fraction (mmmm fraction) can be determined by, for example, a method described in Japanese Patent Laid-Open Publication No. 186664/2007.

The propylene-based polymer (A) for use in the invention has a melting point (Tm), as obtained by a differential scanning calorimeter (DSC) measurement, of not lower than 110° C. but not higher than 170° C., preferably not lower than 120° C. but not higher than 168° C., and the amount of heat of fusion (ΔH), as obtained at the same time, is preferably not less than 50 mJ/mg.

When the properties of the propylene-based polymer (A) are in the above ranges, a propylene-based polymer composition which is excellent in moldability, heat resistance and transparency and has little stickiness is obtained, so that such ranges are preferable.

The melt flow rate (MFR, ASTM D1238, 230° C., under load of 2.16 kg) of the propylene-based polymer (A) is in the range of preferably 0.01 to 400 g/10 min, more preferably 0.1 to 100 g/10 min.

From the propylene-based polymer (A) having such a MFR value, a propylene polymer composition having excellent fluidity and capable of producing a large molded product is obtained.

When the propylene-based polymer (A) is a propylene/α-olefin random copolymer, the α-olefin is preferably selected from ethylene and α-olefins of 4 to 20 carbon atoms, and the copolymer desirably contains this α-olefin in an amount of 0.1 to 8% by mol, preferably 0.2 to 7.5% by mol, more preferably 0.3 to 7% by mol.

The tensile modulus of the propylene-based polymer (A) in the invention is preferably not less than 500 MPa. The tensile modulus is a value measured at 23° C. in accordance with JIS K7113-2 using a pressed sheet having a thickness of 2 mm prepared from the propylene-based polymer (A) in the invention.

Such a propylene-based polymer (A) for use in the invention, e.g., an isotactic propylene-based polymer, can be prepared by various processes, and for example, it can be prepared by the use of a stereoregular catalyst.

More specifically, the propylene-based polymer (A) can be prepared by the use of a catalyst formed from a solid titanium catalyst component, an organometallic compound catalyst component, and if necessary, an electron donor.

The solid titanium catalyst component is specifically a solid titanium catalyst component in which titanium trichloride or a titanium trichloride composition is supported on a carrier having a specific surface area of not less than 100 m$^2$/g or a solid titanium catalyst component in which magnesium, halogen, an electron donor (preferably aromatic carboxylic acid ester or alkyl group-containing ether) and titanium are contained as essential components and these essential components are supported on a carrier having a specific surface area of not less than 100 m$^2$/g.

The propylene-based polymer (A) can be also prepared by the use of a metallocene catalyst.

The organometallic compound catalyst component is preferably an organoaluminum compound, and examples of the organoaluminum compounds include trialkylaluminum, dialkylaluminum halide, alkylaluminum sesquihalide and alkylaluminum dihalide.

The organoaluminum compound can be properly selected according to the type of the titanium catalyst component used.

As the electron donor, an organic compound having a nitrogen atom, a phosphorus atom, a sulfur atom, a silicon atom, a boron atom or the like is employable, and preferable are an ester compound and an ether compound each of which has such an atom.

Such a catalyst may be further activated by a proper means such as copulverization, or such an olefin as above may have been prepolymerized onto the catalyst.

(B) Propylene/ethylene/α-olefin Copolymer

The propylene/ethylene/α-olefin copolymer (B) used in the propylene-based polymer compositions (X0) to (X3) of the invention is a random copolymer formed from propylene, ethylene and an α-olefin of 4 to 20 carbon atoms, and satisfies the following requirements (I) to (III).

(I) The copolymer (B) contains constitutional units derived from propylene in amounts of 73.1 to 87.0% by mol, constitutional units derived from ethylene in amounts of 10 to 16.9% by mol and constitutional units derived from an α-olefin of 4 to 20 carbon atoms in amounts of 3.0 to 10.0% by mol.

When the amounts of the constitutional units are in the ranges of (I), the copolymer (B) becomes most appropriately compatible with the propylene-based polymer (PP) (A), and therefore, a propylene-based polymer composition (X0) which is excellent in transparency and heat resistance (particularly, heat resistance at high heat deformation temperature) and is free from occurrence of stickiness even if it is used at a high temperature for a long period of time can be obtained.

As the α-olefin of 4 to 20 carbon atoms, 1-butene is preferable.

Particularly when the copolymer (B) contains constitutional units derived from propylene in amounts of preferably 73.1 to 83.0% by mol, more preferably 76.4 to 81.5 by mol, still more preferably 76.6 to 81.5% by mol, constitutional units derived from ethylene in amounts of preferably 14.0 to 16.9% by mol, more preferably 14.5 to 16.6% by mol, still more preferably 14.5 to 16.4% by mol, and constitutional units derived from an α-olefin of 4 to 20 carbon atoms in amounts of 3.0 to 10.0% by mol, preferably 4.0 to 7.0% by mol, more preferably 4.0 to 7.0% by mol, the copolymer (B) becomes most appropriately compatible with the propylene-based polymer (PP) (A), and therefore, it becomes possible to obtain a propylene-based polymer composition (X1) which is excellent in flexibility, transparency and heat resistance (particularly, heat resistance at high heat deformation temperature) and is free from occurrence of stickiness even if it is used at a high temperature for a long period of time and a propylene-based polymer composition (X2) which is excellent in transparency, mar resistance, whitening resistance and heat resistance and is free from occurrence of stickiness even if it is used at a high temperature for a long period of time.

Moreover, when the copolymer (B) contains constitutional units derived from propylene in amounts of preferably 76.0 to 87.0% by mol, more preferably 79.2 to 85.5 by mol, still more preferably 79.4 to 85.5% by mol, constitutional units derived from ethylene in amounts of preferably 10.0 to 14.0% by mol, more preferably 10.5 to 13.8% by mol, still more preferably 10.5 to 13.6% by mol, and constitutional units derived from an α-olefin of 4 to 20 carbon atoms in amounts of preferably 4.0 to 7.0% by mol, more preferably 4.0 to 7.0% by mol, it becomes possible to obtain a propylene-based polymer composition (X3) which is inhibited from staining an adherend over a long period of time, is excellent in transparency and heat resistance (particularly, heat resistance at high heat deformation temperature), is free from occurrence of stickiness even if it is used at a high temperature for a long period of time, and is favorable particularly for a protective film.

In the case where the contents of ethylene and the α-olefin are in the above ranges (specifically, the ethylene content is higher than the α-olefin content), there also resides an advantage that productivity in the later-described production of the propylene/ethylene/α-olefin copolymer (B) in the invention is improved (specifically, a copolymer of high molecular weight is obtained and catalytic activity is high).

(II) The copolymer (B) has an isotactic triad fraction (mm), as calculated by $^{13}$C-NMR, of not less than 85%, preferably not less than 88%.

The propylene/ethylene/α-olefin copolymer (B) having a mm value of the above range exhibits excellent compatibility with the propylene-based polymer (PP) (A). In addition, mechanical properties (strength, elongation) of the propylene/ethylene/α-olefin copolymer (B) become excellent, and accordingly, a propylene-based polymer composition having excellent mechanical properties is obtained. If the mm value is not in the above range, increase of glass transition temperature (Tg) and lowering of low-temperature properties are brought about in addition to lowering of compatibility with the propylene-based polymer (PP) (A) and lowering of mechanical properties.

The mm value of the propylene/ethylene/α-olefin copolymer (B) in the invention is determined by the method described from the 7th line in Page 21 to the 6th line in Page 26 of International Publication No. 2004/087775 Pamphlet.

(III) The copolymer (B) has a molecular weight distribution (Mw/Mn, Mw: weight-average molecular weight, Mn: number-average molecular weight, both being in terms of polystyrene), as measured by gel permeation chromatography (GPC), of not more than 3.5, preferably not more than 3.0.

That the Mw/Mn of the propylene/ethylene/α-olefin copolymer (B) is in the above range means little stickiness of a material. That is to say, this greatly contributes to inhibition of stickiness occurring when the propylene-based polymer composition of the invention is used in a high temperature environment, so that such a range is preferable.

It is also preferable that:

(IV) the propylene/ethylene/α-olefin copolymer (B) has a B value, as defined by the following formula [1], of not less than 0.8 but not more than 1.3.

[Formula 2]

$$B = \frac{M_{OE}}{2M_O \cdot M_E} \qquad [1]$$

In the formula [1], $M_{OE}$ is a molar fraction of the total of propylene-ethylene sequences and α-olefin of 4 or more carbon atoms-ethylene sequences to all the dyads, $M_O$ is the total of a molar fraction of propylene and a molar fraction of an α-olefin of 4 or more carbon atoms, and $M_E$ is a molar fraction of ethylene.

A large B value means that the copolymer has a molecular primary structure which is close to that of an alternating copolymer wherein the monomers (propylene, ethylene, α-olefin of 4 to 20 carbon atoms) are alternately bonded, and such a propylene/ethylene/α-olefin copolymer (B) sometimes has poor compatibility with the propylene-based polymer (PP) (A). A small B value means that the copolymer has a molecular primary structure which is close to that of a block copolymer wherein the monomers are in close order, and also in this case, the propylene/ethylene/α-olefin copolymer (B) sometimes has poor compatibility with the propylene-based polymer (PP) (A).

Accordingly, because the copolymer (B) has a B value of the above range in addition to the composition ratio of propylene, ethylene and the α-olefin of 4 to 20 carbon atoms described in (I), the copolymer (B) becomes most appropriately compatible with the propylene-based polymer (PP) (A).

The B value of the propylene/ethylene/α-olefin copolymer (B) in the invention can be determined by the method described in Japanese Patent Laid-Open Publication No. 186664/2007.

It is also preferable that the propylene/ethylene/α-olefin copolymer (B) in the propylene-based polymer compositions (X1) and (X2) of the invention satisfies one or more of the following requirements (V) to (VII).

(V) The melting point (Tm), as measured by a differential scanning calorimeter (DSC), is lower than 65° C., or the melting point (Tm) is not observed.

The propylene/ethylene/α-olefin copolymer (B) satisfying the requirements (I), (II) and (III) and further having a melting point of the above range, preferably the propylene/ethylene/α-olefin copolymer (B) satisfying the requirements (I), (II), (III) and (IV) and further having a melting point of the above range, indicates that the copolymer (B) has high stereoregularity (little inversion), a narrow composition distribution and a homogeneous molecular structure, and such a copolymer (B) is favorable in the invention.

(VI) The glass transition temperature (Tg), as measured by a differential scanning calorimeter (DSC), is in the range of −40 to −10° C.

The propylene/ethylene/α-olefin copolymer (B) satisfying the requirements (I), (II) and (III) and further having a glass transition temperature (Tg) of the above range, preferably the propylene/ethylene/α-olefin copolymer (B) satisfying the requirements (I), (II), (III) and (IV) and further having a glass transition temperature (Tg) of the above range, indicates that the copolymer (B) has high stereoregularity (little inversion), a narrow composition distribution and a homogeneous molecular structure, and the low-temperature properties of the propylene-based polymer composition (X1) and the propylene-based polymer composition (X2) are also improved, so that such a copolymer (B) is very favorable.

The DSC measuring conditions to determine the melting point (Tm) and the glass transition temperature (Tg) of the propylene/ethylene/α-olefin copolymer (B) are as follows. A sample is placed in an aluminum pan, then (i) it is heated up to 200° C. at 100° C./min and held at 200° C. for 5 minutes, then (ii) it is cooled down to −50° C. at 20° C./min, then (iii) it is heated up to 200° C. at 20° C./min, and an endothermic curve obtained in (iii) is analyzed to determine Tm and Tg.

(VII) The Shore A hardness, as measured in accordance with ASTM D2240, is in the range of 60 to 88, preferably 65 to 85, more preferably 70 to 80.

By the use of the propylene/ethylene/α-olefin copolymer (B) satisfying the requirements (I), (II) and (III) and further having a Shore A hardness of the above range, preferably the propylene/ethylene/α-olefin copolymer (B) satisfying the requirements (I), (II), (III) and (IV) and further having a Shore A hardness of the above range, flexibility of the propylene-based polymer composition (X1) can be readily designed to be in the desired range, so that such a copolymer (B) is favorable.

That the hardness of the propylene/ethylene/α-olefin copolymer (B) is in the above range means that the propylene/ethylene/α-olefin copolymer (B) has optimum crystallizability, and it becomes possible to allow various properties, such as flexibility, transparency and rubber elasticity, and prevention of occurrence of stickiness in the use of the polymer composition at a high temperature to be compatible with each other, this being the object of the present invention. In particular, the copolymer (B) having a hardness of the preferred range is favorable because flexibility and prevention of occurrence of stickiness in the use of the polymer composition at a high temperature are compatible with each other at a high level.

When the propylene/ethylene/α-olefin copolymer (B) satisfies all of the requirements (I) to (VII), a polymer composition obtained by the use of this copolymer (B) is improved in heat resistance, and the degree of stickiness occurring when the polymer composition is used at a high temperature is further lowered.

Moreover, it is preferable that the propylene/ethylene/α-olefin copolymer (B) in the propylene-based polymer composition (X3) satisfies one or more of the following requirements (V) to (VII).

(V) The melting point (Tm), as measured by a differential scanning calorimeter (DSC), is lower than 80° C.

The propylene/ethylene/α-olefin copolymer (B) satisfying the requirements (I), (II) and (III) and further having a melting point of the above range, preferably the propylene/ethylene/α-olefin copolymer (B) satisfying the requirements (I), (II), (III) and (IV) and further having a melting point of the above range, indicates that the copolymer (B) has high stereoregularity (little inversion), a narrow composition distribution and a homogeneous molecular structure, and such a copolymer (B) is favorable in the invention.

(VI) The glass transition temperature (Tg), as measured by a differential scanning calorimeter (DSC), is in the range of −40 to −10° C.

The propylene/ethylene/α-olefin copolymer (B) satisfying the requirements (I), (II) and (III) and further having a glass transition temperature (Tg) of the above range, preferably the propylene/ethylene/α-olefin copolymer (B) satisfying the requirements (I), (II), (III) and (IV) and further having a glass transition temperature (Tg) of the above range, indicates that the copolymer (B) has high stereoregularity (little inversion), a narrow composition distribution and a homogeneous molecular structure, and the low-temperature properties of the propylene-based polymer composition (X3) are also improved, so that such a copolymer (B) is very favorable.

The DSC measuring conditions to determine the melting point (Tm) and the glass transition temperature (Tg) of the propylene/ethylene/α-olefin copolymer (B) are the same as those previously described.

(VII) The Shore A hardness, as measured in accordance with ASTM D2240, is in the range of 83 to 98, preferably 85 to 95, more preferably 88 to 95.

By the use of the propylene/ethylene/α-olefin copolymer (B) satisfying the requirements (I), (II) and (III) and further having a Shore A hardness of the above range, preferably the propylene/ethylene/α-olefin copolymer (B) satisfying the requirements (I), (II), (III) and (IV) and further having a Shore A hardness of the above range, adhesion of the propylene-based polymer composition (X3) to an adherend can be designed to be in the desired range, and staining of the polymer composition on an adherend can be inhibited over a long period of time, so that such a copolymer (B) is favorable.

That the hardness of the propylene/ethylene/α-olefin copolymer (B) is in the above range means that the propylene/ethylene/α-olefin copolymer (B) has optimum crystallizability, and it becomes possible to obtain various properties, such as heat resistance (particularly, heat resistance at high heat deformation temperature) and transparency, to prevent occurrence of stickiness in the use of the polymer composition at a high temperature and to inhibit staining of the polymer composition on an adherend over a long period of time, this being the object of the present invention (X3). On that account, the copolymer (B) is particularly favorable for a protective film. In particular, the copolymer (B) having a hardness of the preferred range can allow adhesion of the polymer composition to an adherend and inhibition of staining of the polymer composition on an adherend over a long period of time to be compatible with each other at a high level.

When the propylene/ethylene/α-olefin copolymer (B) satisfies all of the requirements (I) to (VII), a polymer composition obtained by the use of this copolymer (B) is improved in heat resistance, and the degree of stickiness occurring when the polymer composition is used at a high temperature is further lowered.

Although MFR (ASTM D1238, 230° C., under load of 2.16 kg) of the propylene/ethylene/α-olefin copolymer (B) is not specifically restricted in the invention, it is in the range of preferably 0.01 to 50 g/10 min, more preferably 0.05 to 10 g/10 min, still more preferably 0.1 to 4 g/10 min.

When the MFR is in this range, strength and impact resistance of the propylene-based polymer composition of the invention, and moldability thereof during processing are improved, so that such MFR is preferable.

Although the process for preparing the propylene/ethylene/α-olefin copolymer (B) is not specifically restricted, the copolymer (B) can be prepared by polymerizing propylene or copolymerizing propylene and another α-olefin in the presence of a publicly known catalyst capable of allowing an olefin to undergo stereoregular polymerization to give an isotactic or syndiotactic structure, such as a catalyst containing a solid titanium component and an organometallic compound as main components or a metallocene catalyst using a metallocene compound as one component of the catalyst. The copolymer (B) can be preferably obtained by copolymerizing propylene, ethylene and an α-olefin of 4 to 20 carbon atoms in the presence of a metallocene catalyst, as described later, and a catalyst described in International Publication No. WO2004/087775 Pamphlet, e.g., a catalyst described in Examples e1 to e5, is employable.

Propylene-Based Polymer Compositions (X0) to (X3)

The propylene-based polymer composition (X0) of the invention comprises the propylene-based polymer (PP) (A) in an amount of 1 to 99 parts by weight and the propylene/ethylene/α-olefin copolymer (B) in an amount of 99 to 1 part by weight.

By virtue of the proportions of both the components in such ranges, an elastomer which is excellent in transparency and heat resistance (particularly, heat resistance at high heat deformation temperature) and is free from occurrence of stickiness even if it is used at a high temperature for a long period of time is obtained.

The propylene-based polymer composition (X1) or (X2) of the invention comprises the propylene-based polymer (PP) (A) in an amount of 1 to 30 parts by weight, preferably 4 to 25 parts by weight, and the propylene/ethylene/α-olefin copolymer (B) in an amount of 70 to 99 parts by weight, preferably 75 to 96 parts by weight, with the proviso that the total amount of the component (A) and the component (B) is 100 parts by weight.

By virtue of the proportions of both the components in such ranges, an elastomer which is excellent in flexibility, transparency, rubber elasticity, heat resistance and mechanical properties is obtained.

As the proportions of both the components are in preferred ranges, the degree of stickiness occurring when the composition is used at a high temperature is further lowered, so that such a composition is favorable.

The propylene-based polymer composition (X2) of the invention comprises the propylene-based polymer (PP) (A) in an amount of 99 to 31 parts by weight, preferably 97 to 50 parts by weight, more preferably 97 to 60 parts by weight, and the propylene/ethylene/α-olefin copolymer (B) in an amount of 1 to 69 parts by weight, preferably 3 to 50 parts by weight, more preferably 3 to 40 parts by weight, with the proviso that the total amount of the component (A) and the component (B) is 100 parts by weight.

By virtue of the proportions of both the components in such ranges, a polypropylene product which is excellent in flexibility, transparency, impact resistance and whitening resistance is obtained.

As the proportions of both the components are in preferred ranges, the degree of stickiness occurring when the composition is used at a high temperature is further lowered, so that such a composition is favorable.

The propylene-based polymer composition of the invention is characterized in that when a slice obtained from a core portion of a sheet having a thickness of 2 mm obtained by press molding the propylene-based polymer composition is dyed with ruthenic acid and observed by a transmission electron microscope (TEM), a phase separation structure is not observed. The pressed sheet is prepared in the following manner. By the use of a hydraulic hot press molding machine preset at 190° C., the propylene-based polymer composition of the invention is preheated for 5 minutes, then subjected to press molding for 2 minutes under a pressure of 10 MPa and then cooled at 20° C. for 4 minutes under a pressure of 10 MPa to prepare a sheet of a given thickness, whereby a specimen is obtained. From the core portion of the pressed sheet, a slice of about 100 nm is cut out by the use of a microtome. The slice is dyed with ruthenium and observed by TEM at proper magnification of 1000 to 100000 times.

That the composition does not have a phase separation structure can be confirmed by that a boundary between a relatively deep color phase and a relatively light color phase cannot be found in the observation, and this corresponds to, for example, FIG. 1.

That the composition of the invention has a phase separation structure can be confirmed by that the TEM image is divided into a relatively deep color phase and a relatively light color phase. This corresponds to, for example, FIG. 2 or 3, and in this figure, portions observed as white spherical domains are considered to be derived from the propylene-based polymer (PP) (A) having high crystallizability.

In order that the composition of the invention should not have a phase separation structure, the propylene/ethylene/α-olefin copolymer (B) satisfies the aforesaid requirements (I), (II) and (III), preferably the requirements (I) to (IV).

The internal haze of a sheet having a thickness of 2 mm obtained by press molding the propylene-based polymer composition (X1) is less than 15%, preferably less than 10%. As the sample for this measurement, a sample obtained by molding the composition under the same conditions as those in the transmission electron microscope (TEM) observation and then allowing the molded product to stand for 72 hours or more is used.

The internal haze of the propylene-based polymer composition (X1) in this range is typically achieved in the case where the propylene-based polymer (PP) (A) and the propylene/ethylene/α-olefin copolymer (B) do not take a phase separation structure, particularly preferably in the case where the propylene/ethylene/α-olefin copolymer (B) satisfies the aforesaid requirements (I) to (VII), as described above.

The total light transmittance of the propylene-based polymer composition (X1) is not less than 90%, preferably not less than 93%, more preferably not less than 95%. As the sample for this measurement, a sample obtained by molding the composition under the same conditions as those in the transmission electron microscope (TEM) observation and then allowing the molded product to stand for 72 hours or more is used. Similarly to the internal haze, the total light transmittance of the propylene-based polymer composition (X1) in this range is typically achieved in the case where the propylene-based polymer (PP) (A) and the propylene/ethylene/α-olefin copolymer (B) do not take a phase separation structure, particularly preferably in the case where the propylene/ethylene/α-olefin copolymer (B) satisfies the aforesaid requirements (I) to (VII), as described above.

It is preferable that the total light transmittance of a sheet having a thickness of 2 mm obtained by press molding the propylene-based polymer composition (X2) satisfies the following formula (2):

$$I(X2) > I(A) \qquad [2]$$

wherein I(X2) represents a total light transmittance of the propylene-based polymer composition (X2); and I(A) represents a total light transmittance of the propylene-based polymer (PP) (A) alone contained in the propylene-based polymer composition (X2).

The pressed sheet used herein is prepared in the following manner. By the use of a hydraulic hot press molding machine preset at 190° C., the propylene-based polymer composition is preheated for 5 minutes, then subjected to press molding for 2 minutes under a pressure of 10 MPa and then cooled at 20° C. for 4 minutes under a pressure of 10 MPa to prepare a sheet of a given thickness, whereby a specimen is obtained.

In order that the total light transmittance of the propylene-based polymer composition (X2) may satisfy the above conditions, the propylene-based polymer composition (X2) does not take a clear phase separation structure. That is to say, it is necessary that the propylene-based polymer composition (PP) (A) and the propylene/ethylene/α-olefin copolymer (B) should not take a phase separation structure, as described above, and for this purpose, the propylene/ethylene/α-olefin copolymer (B) preferably satisfies the aforesaid requirements (I) to (VII).

As the propylene-based polymer composition (X2), a polymer composition having a property that the internal haze of a sheet having a thickness of 2 mm obtained by press molding the polymer composition satisfies the following relationship [3] is also preferable.

$$Hz(X2) < H(A) \quad [3]$$

wherein Hz(X2) represents an internal haze of the propylene-based polymer composition (X2), and Hz(A) represents an internal haze of the propylene-based polymer (PP) (A) alone contained in the propylene-based polymer composition (X2).

In the present invention, one or both of the propylene-based polymer (PP) (A) and the propylene/ethylene/α-olefin copolymer (B), which constitute such a propylene-based polymer composition of the invention as above, may have been graft modified with a polar monomer.

For example, a part or all of the component (A) may have been graft modified, or a part or all of the component (B) may have been graft modified, or a part or all of each of the component (A) and the component (B) may have been graft modified.

Examples of the polar monomers include a hydroxyl group-containing ethylenically unsaturated compound, an amino group-containing ethylenically unsaturated compound, an epoxy group-containing ethylenically unsaturated compound, an aromatic vinyl compound, an unsaturated carboxylic acid or its derivative, a vinyl ester compound, vinyl chloride, a carbodiimide compound and a silane coupling agent.

As the polar monomer, an unsaturated carboxylic acid or its derivative, or a silane coupling agent is particularly preferable. Examples of the unsaturated carboxylic acids or their derivatives include an unsaturated compound having one or more carboxylic acid groups, an ester of a compound having a carboxylic acid group and an alkyl alcohol, and an unsaturated compound having one or more carboxylic anhydride groups. Examples of the unsaturated groups include a vinyl group, a vinylene group and an unsaturated cyclic hydrocarbon group.

Examples of the silane coupling agents include n-butyltrimethoxysilane, n-butyltriethoxysilane, n-hexyltrimethoxysilane, n-hexyltriethoxysilane, n-octyltrimethoxysilane, n-octyltriethoxysilane, n-octyltripropoxysilane, vinyltriethoxysilane, vinyltrimethoxysilane, vinyltris(β-methoxyethoxysilane), γ-glycidoxypropyltrimethoxysilane and γ-aminopropyltriethoxysilane.

By allowing a modification target to react with the polar monomer using an extruder or the like, a modified propylene-based polymer composition can be also prepared.

Such a propylene-based polymer composition a part or all of which has been modified with the polar monomer as above is obtained by allowing a modification target (unmodified propylene-based polymer composition) to react with the polar monomer using, for example, an extruder, or can be obtained by mixing any one of the already modified component (A) and component (B) with the unmodified-component (A) or component (B), or may be obtained by mixing the already modified component (A) and component (B) with each other.

The propylene-based polymer composition of the invention may contain other polymers as arbitrary components within limits not detrimental to the objects of the present invention.

In this case, the amounts of other polymers added are not specifically restricted, but for example, the amounts thereof are preferably in the range of about 0.1 to 30 parts by weight based on 100 parts by weight of the total of the propylene-based polymer (A) and the propylene/ethylene/α-olefin copolymer (B) used in the invention.

It is also preferable that to the propylene-based polymer composition (X1) or (X3) of the invention may have been added one or more elastomers selected from the group consisting of a styrene/diene-based copolymer, a hydrogenation product thereof and a styrene/isobutylene copolymer in amounts of 5 to 400 parts by weight, preferably 10 to 350 parts by weight, more preferably 15 to 300 parts by weight, based on 100 parts by weight of the propylene-based polymer composition. By virtue of the elastomer contained, adhesive force is increased, and the composition can be favorably used for, for example, an adhesive A polymer composition which contains only the component (A) and the component (B) as polymer components but does not contain other elastomers and other resins is also an embodiment of the present invention, and in this case, the polymer composition is excellent particularly in transparency.

To the propylene-based polymer composition of the invention, additives, such as weathering stabilizer, heat stabilizer, antistatic agent, anti-slip agent, anti-blocking agent, anti-fogging agent, nucleating agent, lubricant, pigment, dye, plasticizer, anti-aging agent, hydrochloric acid absorbent and antioxidant, may be added when necessary, within limits not detrimental to the objects of the present invention. For the purpose of further imparting transparency to the propylene-based polymer composition of the invention, a specific nucleating agent (also referred to as a "crystal nucleating agent" or a "transparent nucleating agent") that is an arbitrary component may be contained. In this case, the nucleating agent is, for example, a dibenzylidene sorbitol-based nucleating agent, a phosphoric acid ester salt-based nucleating agent, a rosin-based nucleating agent or a benzoic acid metal salt-based nucleating agent. Although the amount added is not specifically restricted, it is preferably in the range of about 0.1 to 1 part by weight based on 100 parts by weight of the total of the component (A) and the component (B) contained in the propylene-based polymer composition.

The propylene-based polymer composition of the invention can be processed by a publicly known molding method, such as blow molding, injection molding, press molding, extrusion method and inflation method.

In a DSC curve (DSC measuring conditions: a sample withdrawn from a part of a molded product is placed in an aluminum pan, (i) it is cooled down to 0° C. and held for 1 minute, and (ii) it is heated up to 200° C. at 20° C./min) of a molded product obtained by molding the propylene-based polymer composition (X1) by the above-mentioned publicly known molding method, an endothermic peak (TmB (1st Run)) on the lower temperature side attributable to the propylene/ethylene/α-olefin copolymer (B) and an endothermic peak (TmA (1st Run)) on the higher temperature side attributable to the propylene-based polymer (PP) (A) are observed. The endothermic peak (TmB (1st Run)) on the lower temperature side attributable to the propylene/ethylene/α-olefin copolymer (B) is observed usually in the range of 30° C. to 60° C.

Similarly to the above, in a DSC curve of a molded product obtained from the propylene-based polymer composition (X3), an endothermic peak (TmB (1st Run)) on the lower temperature side attributable to the propylene/ethylene/α-olefin copolymer (B) and an endothermic peak (TmA (1st Run)) on the higher temperature side attributable to the propylene-based polymer (PP) (A) are observed, and the endothermic peak (TmB (1st Run)) on the lower temperature side attributable to the propylene/ethylene/α-olefin copolymer (B) is observed usually in the range of 40° C. to 80° C.

The present inventors have found that when the propylene-based polymer composition (X1) or (X3) is annealed for a specific time (t hr) at a specific temperature (Ta° C.), TmB (1st Run) is shifted to the higher temperature side than the annealing treatment temperature (Ta° C.) by about 5° C. to 20° C., to their surprise. For the annealing, heat treatment is carried out under the annealing conditions of a temperature of usually 30° C. to 120° C., preferably 35° C. to 100° C., more preferably 40° C. to 80° C., and a time of usually not less than 1 hour, preferably not less than 12 hours, more preferably not less than 24 hours, particularly preferably not less than 72 hours. The reason is presumed to be that by the annealing treatment, the crystal structure of the propylene/ethylene/α-olefin copolymer (B) in the propylene-based polymer composition (X1) or (X3) is changed into a more stable state, and a more strong crystal is formed. The propylene-based polymer composition (X1) or (X3) having been changed into such a state by the annealing treatment exhibits more excellent heat resistance. Therefore, of the molded products formed from the propylene-based polymer composition (X1) or (X3), molded products formed from the propylene-based polymer composition (X1) or (X3) having been subjected to the above-mentioned heat treatment are particularly preferable molded products of the invention. The heat treatment method is not specifically restricted, and methods using publicly known heat treatment equipment, such as a method wherein the treatment is carried out at normal pressure and a method wherein the treatment is carried out under pressure using an autoclave, are employable.

Examples of uses of the propylene-based polymer composition of the invention are given below, but uses are not limited to those examples.

The propylene-based polymer composition of the invention can be favorably used for automotive interior trim parts, automotive exterior trim parts, electrical appliance parts, civil engineering/building material parts, packaging materials, sealing materials, adhesives, daily necessaries/industrial materials, medical supplies, clothing materials, optical materials, toys, leisure goods, etc. More specifically, the polymer composition can be favorable for cap liner, gasket, glass interlayer, door, door frame, window frame, crownmolding, baseboard, opening frame, floor material, ceiling material, wall paper, stationary, office supplies, anti-slip sheet, skin material for building material, pipe, electric wire, sheath, wire harness, protective film adhesive layer, hot melt adhesive, sanitary goods, medical bag/tube, non-woven fabric, stretchable material, fiber, sole, midsole, innersole, sole, sandal, packaging film, sheet, food packaging film (outer layer, inner layer, sealant, single layer), stretchable film, wrapping film, tableware, retort container, stretched film, gas permeable film, sealing sheet for electric/electronic element, various uses of the sealing sheet (sealing sheet for solar cell, solar cell module, electric power generation equipment and the like), etc.

The propylene-based polymer composition of the invention is particularly preferably applied to automotive interior trim parts which are used at high temperatures for a long period of time, civil engineering/building material parts, packaging materials, sealing materials, medical supplies which have a fear of deterioration of hygienic qualities and performance due to stickiness, adhesives, etc. among them.

Further, the propylene-based polymer composition of the invention is favorably used for an adhesive of a protective film adhesive layer, which needs to be free from staining an adherend when the protective film is peeled off after it is used at a high temperature for a long period of time, and a light guide sheet utilizing light transmission property and transparency, more specifically, a sheet for keypad, which is present on the back surfaces of keys in a cellular phone and needs transmission property, flexibility and rubber elasticity (CS) for purposes of transmission of LED light and recovery from repeated pressing of keys and further needs to be free from occurrence of surface stickiness even if it is used at a high temperature for a long period of time.

In the present invention, an adhesive sheet or film of one or more layers, which has an adhesive layer composed of the above-mentioned adhesive, is also preferable. A multi-layer film using the adhesive of the invention is specifically a film wherein a surface layer (adhesive layer) composed of an adhesive comprising the propylene-based polymer composition (X1 or X3) of the invention is laminated on one or both surfaces of a substrate having a single-layer or multi-layer structure.

The substrate layer of the multi-layer film is not specifically restricted, but it is preferably a substrate of a thermoplastic resin, and examples of the thermoplastic resins include polypropylene-based resins (homopolymer of propylene, and random or block copolymer of propylene and a small amount of an α-olefin), polyethylene-based resins (low-density polyethylene, medium-density polyethylene, high-density polyethylene and linear low-density polyethylene), publicly known ethylene-based polymers (ethylene/α-olefin copolymer, ethylene/ethyl acrylate copolymer, ethylene/vinyl acetate copolymer, ethylene/methyl methacrylate copolymer, ethylene/n-butyl acrylate copolymer), poly-4-methyl-pentene-1, and combinations thereof.

From the viewpoint of obtaining excellent adhesive strength between the surface layer (adhesive layer) and the substrate, a polyolefin-based resin having good compatibility with the adhesive comprising the propylene-based polymer composition (X1 or X3) of the invention is preferably used for a layer which comes into direct contact with the surface layer (adhesive layer).

The surface of the substrate layer may have been subjected to a surface treatment method, such as corona discharge treatment, plasma treatment, flame treatment, electron ray irradiation treatment or ultraviolet ray irradiation treatment, and the substrate layer may be a colorless transparent layer or a colored or printed layer.

As the substrate, a monoaxially or biaxially stretched substrate is also employable.

The multi-layer film using the adhesive of the invention can be obtained by, for example, a publicly known multi-layer film production method, and preferred examples of the methods include a method wherein a surface layer composed of an adhesive containing the propylene-based polymer composition (X1 or X3) of the invention and a substrate layer are co-extruded using a T-die film method or an inflation film method, and a method wherein a surface layer (adhesive layer) composed of an adhesive containing the propylene-based polymer composition (X1 or X3) of the invention is formed on a substrate by extrusion coating.

The multi-layer film of the invention may have been stretched monoaxially or biaxially. A preferred method for monoaxial stretching is, for example, a roll stretching method usually used. Examples of the biaxial stretching methods include a successive stretching method wherein monoaxial stretching is carried out and then stretching in a different direction is carried out to perform biaxial stretching and a simultaneous stretching method such as tubular stretching. A method of coating a substrate with a solution obtained by dissolving an adhesive in a solvent is also available.

The thickness of the surface protective film (multi-layer film) using the adhesive of the invention is not specifically restricted, but it is in the range of preferably about 5 to 5000 μm, more preferably about 10 to 1000 μm. The thickness of the surface layer (adhesive layer) is not specifically restricted and can be selected according to the type of an adherend and the properties (e.g., adhesive strength) required, but it is in the range of usually 1 to 1000 μm, preferably 3 to 500 μm.

When the multi-layer film using the adhesive of the invention is used as a (surface) protective film, a release paper or a release film may be interposed or a release agent may be applied to the back surface of the substrate layer in order to prevent blocking (sticking) of the multi-layer films of the invention to each other.

In order to impart a function such as slipperiness to the surface of the substrate layer when necessary, the thermoplastic resin for the substrate layer may be used in combination with an additive such as a release agent.

The multi-layer film obtained by the use of the adhesive of the invention can be favorably used as a surface protective film for protecting metal plates, such as aluminum plate, steel plate and stainless steel plate, painted plates thereof, members for processing, such as glass plate and synthetic resin plate, electrical appliances using these members, automotive parts and electronic parts. Examples of such surface protective films include protective films in the field of electronics, such as optical plate protective film, lens protective film, back grinding tape for semiconductor wafer, dicing tape and protective tape for printed board, films for window glass protection, and films for baking finish.

EXAMPLES

The present invention is further described with reference to the following examples, but it should be construed that the invention is in no way limited to those examples.

Evaluation Items (1) Properties of Propylene-Based Polymer Compositions (Examples 1 to 5, Comparative Examples 1 to 4)

(a) TEM Image Observation

A pressed sheet sample having a thickness of 2 mm was used and observed. The pressed sheet is prepared in the following manner. By the use of a hydraulic hot press molding machine preset at 190° C., the propylene-based polymer composition is preheated for 5 minutes, then subjected to press molding for 2 minutes under a pressure of 10 MPa and then cooled at 20° C. for 4 minutes under a pressure of 10 MPa to prepare a sheet of a given thickness, whereby a specimen is obtained.

(b) Hardness (Shore A Hardness)

A pressed sheet sample having a thickness of 2 mm (the same sample as used in the TEM photograph observation) was allowed to stand for 72 hours at room temperature after molding. Then, using an A type measuring device, an indenter point was brought into contact with the sample, and immediately, the graduations were read (in accordance with ASTM D-2240).

(c) Transparency (Internal Haze, Total Light Transmittance)

With regard to a pressed sheet sample having a thickness of 2 mm (produced in the same manner as that for the sample used in the TEM photograph observation), the amount of diffuse transmitted light and the amount of total transmitted light were measured in a cyclohexanol solution by the use of a digital turbidity meter "NDH-2000" manufactured by Nippon Denshoku Industries Co., Ltd. and a C light source, and then internal haze and total light transmittance were calculated from the following formulas.

Internal haze (%)=100×(amount of diffuse transmitted light)/(amount of total transmitted light)

Total light transmittance (%)=100×(amount of total transmitted light)/(amount of incident light)

(d) Mechanical Properties (Strength at Break, Elongation at Break, Young's Modulus)

Strength at break (TS, (MPa)), elongation at break (between chucks, EL, (%)) and Young's modulus (YM, (MPa)) of a pressed sheet sample having a thickness of 2 mm (produced in the same manner as that for the sample used in the TEM photograph observation) were measured in accordance with JIS K7113-2 (pulling rate: 200 mm/min).

(e) Rubber Elasticity (Compression Set CS, (%))

Six pressed sheet samples each having a thickness of 2 mm (the same sample as used in the TEM photograph observation) were superposed upon one another, compressed by 25%, held at a given temperature (23° C. or 70° C.) for 24 hours and then set free. After the test, the thickness was measured. From the result, permanent set (compression set) after holding for 24 hours was calculated from the following formula.

Permanent set (%)=100×(thickness before test−thickness after test)/(thickness before test−thickness at the time of compression)

(f) Heat Resistance (Heat Deformation, TMA Softening Temperature (° C.))

Using a pressed sheet sample having a thickness of 2 mm (the same sample as used in the TEM photograph observation), a pressure of 2 kgf/cm² was applied to a plane indenter having a diameter of 1.8 mm at a heating rate of 5° C./min by the use of a thermal mechanical analysis device (TMA) in accordance with JIS K7196, and from the TMA curve, a needle penetration temperature (° C.) was determined.

(g) Heat Resistance (Stickiness Test in Atmosphere of Room Temperature after Long Time Heat Treatment)

A single layer sheet of 500 μm was prepared by a cast molding machine (extrusion temperature: 190° C., take-off rate: 3 m/min), and this sheet was treated with a Geer oven at 80° C. for 1 week. The sample taken out was cooled down to room temperature, and after 2 hours, the following tests were carried out.

(g-1) Presence of Stickiness (Organoleptic Test)

Presence of stickiness on the surface of the sheet taken out was judged by the following grades.

AA: The surface is not sticky.

BB: The surface is sticky.

(g-2) Adhesive Force (N/cm)

A sample sheet was cut into specimens each having a width of 12.5 mm and a length of 120 mm, then the specimens were superposed upon each other in such a manner that their surfaces (chill roll contact surface in the cast molding) faced each other, and with applying a load of 2.5 kg to each specimen, the specimens were treated under the following conditions. Thereafter, peel strength (T-peel) was measured to evaluate blocking resistance (23° C., 24 hours).

(h) Heat Resistance (Tack Test at High Temperature after Long Time Heat Treatment)

A single layer sheet of 500 μm was prepared by a cast molding machine (extrusion temperature: 190° C., take-off rate: 3 m/min), and this sheet was treated at 40° C. for 1 week in a constant temperature room. Thereafter, the following evaluation was carried out in a constant temperature room (40° C.).

(h-1) Presence of Tack (Organoleptic Test)

The surfaces of the sheets were brought into contact with each other, and presence of tack was judged by the following grades.

AA: The sheets were readily peeled from each other because of no tack.

BB: The sheets were not peeled from each other because of strong tack.

(i) Measurement of TmB (1st Run) by Differential Scanning Calorimeter (DSC)

Using fragments of the samples having been subjected to treatments of the aforesaid (g) Heat resistance (stickiness test in atmosphere of room temperature after long time heat treatment) and (h) Heat resistance (tack test at high temperature after long time heat treatment), DSC curves of the propylene-based polymer compositions were measured. The measuring conditions are as follows.

(i) The sample was cooled down to 0° C. and held for 1 minute, then (ii) it was heated up to 200° C. at 20° C./min, and an endothermic curve obtained in (ii) was analyzed to analyze an endothermic peak TmB (1st Run) on the lower temperature side.

(2) Properties of Propylene-Based Polymer Compositions (Reference Example 1, Examples 11 to 12, Comparative Examples 11 to 13)

(a) TEM Image Observation

A pressed sheet having a thickness of 2 mm was used and observed. The pressed sheet is prepared in the following manner. By the use of a hydraulic hot press molding machine preset at 190° C., the propylene-based polymer composition is preheated for 5 minutes, then subjected to press molding for 2 minutes under a pressure of 10 MPa and then cooled at 20° C. for 4 minutes under a pressure of 10 MPa to prepare a sheet of a given thickness, whereby a specimen is obtained.

(b) Transparency (Internal Haze, Total Light Transmittance)

With regard to a pressed sheet sample having a thickness of 2 mm (produced in the same manner as that for the sample used in the TEM photograph observation), the amount of diffuse transmitted light and the amount of total transmitted light were measured in a cyclohexanol solution by the use of a digital turbidity meter "NDH-2000" manufactured by Nippon Denshoku Industries Co., Ltd. and a C light source, and then internal haze and total light transmittance were calculated from the following formulas.

Internal haze (%)=100×(amount of diffuse transmitted light)/(amount of total transmitted light)

Total light transmittance (%)=100×(amount of total transmitted light)/(amount of incident light)

(c) Mechanical Properties (Yield Stress, Strength at Break, Elongation at Break, Young's Modulus)

Yield stress (YS, (MPa)), strength at break (TS, (MPa)), elongation at break (between chucks, EL, (%)) and Young's modulus (YM, (MPa)) of a pressed sheet sample having a thickness of 2 mm (produced in the same manner as that for the sample used in the TEM photograph observation) were measured in accordance with JIS K7113-2 (pulling rate: 200 mm/min).

(d) Whitening Resistance (Organoleptic Test)

A pressed sheet sample having a thickness of 0.5 mm (produced in the same manner as that for the sample used in the TEM photograph observation) was bent, and whitening of the sample was judged by visual observation.

AA: The sample is not whitened.

BB: The sample is slightly whitened.

CC: The sample is markedly whitened.

(f) Heat Resistance (Stickiness Test)

A pressed sheet sample having a thickness of 0.5 mm (produced in the same manner as that for the sample used in the TEM photograph observation) was treated with a Geer oven at 80° C. for 1 week. The sample taken out was cooled down to room temperature, and after 2 hours, presence of stickiness (organoleptic test) on the surface of the sample was judged by the following grades.

AA: The surface is not sticky.

BB: The surface is slightly sticky.

CC: The surface is sticky.

(3) Properties of Propylene-Based Polymer Compositions (Examples 21 to 26, Comparative Examples 21 to 22)

(a) Adhesive Force to Adherend

Adhesive force was measured in accordance with a test method of an adhesive film (JIS 20237-2000). To a surface of an adhesive film sample, which was not an object of adhesive force measurement, a polyethylene terephthalate sheet of 25 μm was applied. A black acrylic plate (available from Mitsubishi Rayon Co., Ltd., trade name: Acrylite REX, shape: 50 mm width×100 mm length×2 mm thickness) as a test plate and the adhesive film were allowed to stand for 1 hour in an environment of a temperature of 23° C. and a relative humidity of 50%, and thereafter, with applying a pressure to the adhesive film by a rubber roll of about 2 kg, the rubber roll was moved back and forth twice to apply the adhesive film to the test plate. After the application, they were allowed to stand for 1 hour in a given environment of a temperature of 23° C. and a relative humidity of 50%. Thereafter, the adhesive film was peeled from the black acrylic plate in the direction of 180° at a rate of 300 mm/min in an environment of a temperature of 23° C. and a relative humidity of 50% to measure an adhesive force. This adhesive force was regarded as an initial adhesive force.

Adhesive force to adherend at 60° C. was measured in the following manner. After the adhesive film was applied as above, the test sample was aged in an oven at 60° C. for 1 day. The test sample was allowed to stand for 1 hour in a given environment of a temperature of 23° C. and a relative humidity of 50%. Thereafter, the adhesive film was peeled from the black acrylic plate in the direction of 180° at a rate of 300 mm/min in an environment of a temperature of 23° C. and a relative humidity of 50% to measure an adhesive force.

(b) Non-Staining Property on Adherend

An adhesive layer of an adhesive film sample was applied (23° C.) to a black acrylic plate (available from Mitsubishi Rayon Co., Ltd., trade name: Acrylite REX, shape: 50 mm width×100 mm length×2 mm thickness) using a rubber roller to prepare a test sample. This test sample was placed in an oven in an atmosphere of 40° C. or 60° C. and aged for 1 day. The adhesive film sample was peeled from the test sample, and whether the adhesive layer had been transferred to the acrylic plate surface was evaluated by visual observation. The evaluation criteria are as follows.

AA: The acrylic plate surface is not stained.
BB: The acrylic plate surface is slightly stained.
CC: The acrylic plate surface is markedly stained.

(4) Raw Materials used in Examples of the Present Invention and Comparative Examples (A) Propylene-based polymer (PP)
(A-1) Homopolypropylene (hPP)

Methods for measuring property values of A-1 and property values of A-1 are described below and set forth in Table 3. The properties in Table 3 were measured in the same manner as in the aforesaid evaluation items.

(a) Melting Point (Tm)

An exothermic endothermic curve was determined by a differential scanning calorimeter (DSC), and the temperature at the position of maximum fusion peak in the temperature rise was regarded as Tm. The measurement was carried out in the following manner. A sample was placed in an aluminum pan, then (i) it was heated up to 200° C. at 100° C./min and held at 200° C. for 5 minutes, then (ii) it was cooled down to −50° C. at 20° C./min, then (iii) it was heated up to 200° C. at 20° C./min, and an endothermic curve obtained was analyzed to determine Tm.

As a result, the melting point (Tm) was 161° C.

(b) MFR

MFR was measured at 190° C. or 230° C. under a load of 2.16 kg in accordance with ASTM D-1238.

As a result, MFR (230° C.) was 7.0 g/10 min.

(c) Isotactic Pentad Fraction (mmmm Fraction)

Isotactic pentad fraction was measured by the use of $^{13}C$-NMR.

As a result, mmmm was 96.5%.

(d) Molecular Weight Distribution (Mw/Mn)

Using GPC (gel permeation chromatography) and using an orthodichlorobenzene solvent (mobile phase), molecular weight distribution (Mw/Mn, in terms of polystyrene, Mw: weight-average molecular weight, Mn: number-average molecular weight) was measured at a column temperature of 140° C. Specifically, molecular weight distribution (Mw/Mn) was measured in the following manner using a gel permeation chromatograph Alliance GPC-2000 model manufactured by Waters Corporation. As separation columns, two TSKgel GNH6-HT columns and two TSKgel GNH6-HTL columns were used, each column had a size of a diameter of 7.5 mm and a length of 300 mm, and the column temperature was 140° C. As a mobile phase, o-dichlorobenzene (available from Wako Pure Chemical Industries, Ltd.) was used, and as an antioxidant, 0.025% by weight of BHT (available from Takeda Pharmaceutical Co., Ltd.) was used, and they were moved at 1.0 ml/min. The sample concentration was 15 mg/10 ml, the sample injection amount was 500 microliters, and as a detector, a differential refractometer was used. As standard polystyrene having a molecular weight of Mw<1000 and standard polystyrene having a molecular weight of Mw>4×10$^6$, polystyrene available from Tosoh Corporation was used, and as standard polystyrene having a molecular weight of $100 \leq Mw \leq 4\times10^6$, polystyrene available from Pressure Chemical Company was used.

As a result, the molecular weight distribution (Mw/Mn) was 4.3.

(B) Propylene/ethylene/α-olefin Copolymer
(B-1) Preparation Examples of propylene/ethylene/α-olefin copolymer (B)

As a polymerization catalyst and a cocatalyst, diphenylmethylene(3-tert-butyl-5-ethylcyclopentadienyl)(2,7-di-tert-butylfluorenyl)zirconium dichloride prepared by the process described in Japanese Patent Laid-Open Publication No. 186664/2007 and methylaluminoxane (available from Tosoh Finechem Corporation, 0.3 mmol in terms of aluminum) were used, respectively, and ethylene, propylene and 1-butene as raw materials were polymerized in a hexane solution by the use of continuous polymerization equipment to obtain 9 kinds of propylene/ethylene/α-olefin copolymers (B-1) to (B-9). Then, propylene/ethylene/α-olefin copolymers (B-10) to (B-17) were obtained in the same manner. Properties of the propylene/ethylene/α-olefin copolymers are set forth in Table 1 and Table 4. These property values were measured by the following methods.

(a) Composition Ratio

Composition ratio was determined by the analysis of a $^{13}C$-NMR spectrum.

(b) B Value

B value was determined by the analysis of a $^{13}C$-NMR spectrum.

(c) Stereoregularity (mm)

Stereoregularity was determined by the analysis of a $^{13}C$-NMR spectrum.

(d) Molecular Weight Distribution (Mw/Mn)

Using GPC (gel permeation chromatography) and using an orthodichlorobenzene solvent (mobile phase), molecular weight distribution (Mw/Mn, in terms of polystyrene, Mw: weight-average molecular weight, Mn: number-average molecular weight) was measured at a column temperature of 140° C. Specifically, molecular weight distribution (Mw/Mn) was measured in the following manner using a gel permeation chromatograph Alliance GPC-2000 model manufactured by Waters Corporation. As separation columns, two TSKgel GNH6-HT columns and two TSKgel GNH6-HTL columns were used, each column had a size of a diameter of 7.5 mm and a length of 300 mm, and the column temperature was 140° C. As a mobile phase, o-dichlorobenzene (available from Wako Pure Chemical Industries, Ltd.) was used, and as an antioxidant, 0.025% by weight of BHT (available from Takeda Pharmaceutical Co., Ltd.) was used, and they were moved at 1.0 ml/min. The sample concentration was 15 mg/10 ml, the sample injection amount was 500 microliters, and as a detector, a differential refractometer was used. As standard polystyrene having a molecular weight of Mw<1000 and standard polystyrene having a molecular weight of Mw>4×10$^6$, polystyrene available from Tosoh Corporation was used, and as standard polystyrene having a molecular weight of $100 \leq Mw \leq 4\times10^6$, polystyrene available from Pressure Chemical Company was used.

(e) Melting Point (Tm), Glass Transition Temperature (Tg)

An exothermic endothermic curve was determined by a differential scanning calorimeter (DSC), and the temperature at the position of maximum fusion peak in the temperature rise was regarded as Tm. Tg was determined from the exothermic endothermic curve in the temperature rise. The measurement was carried out in the following manner. A sample was placed in an aluminum pan, then (i) it was heated up to 200° C. at 100° C./min and held at 200° C. for 5 minutes, then (ii) it was cooled down to −50° C. at 20° C./min, then (iii) it was heated up to 200° C. at 20° C./min, and an endothermic curve obtained in (iii) was analyzed to determine Tm and Tg.

(f) Hardness (Shore A Hardness)

By the use of a hydraulic hot press molding machine preset at 190° C., a sample was preheated for 5 minutes, then subjected to press molding for 2 minutes under a pressure of 10 MPa and then cooled at 20° C. for 4 minutes under a pressure of 10 MPa to prepare a sheet of a given thickness, whereby a specimen was obtained. After molding, the specimen was allowed to stand for 72 hours at room temperature. Thereafter, using an A type measuring device, an indenter point was brought into contact with the specimen, and immediately, the graduations were read (in accordance with ASTM D-2240).

(g) MFR

MFR was measured at 190° C. or 230° C. under a load of 2.16 kg in accordance with ASTM D-1238.

(5) Evaluation of propylene-based polymer Compositions

Examples 1 to 5

Raw materials consisting of 10% by weight of (A) homopolypropylene (hPP) and 90% by weight of the propylene/ethylene/α-olefin copolymer (B-1, 2, 3, 4 or 5) were kneaded by a labo-plastomill (manufactured by Toyo Seiki Co., Ltd.) at 190° C. and 40 rpm for 3 minutes to obtain a propylene-based polymer composition. The propylene-based polymer composition was evaluated by the aforesaid methods (a) to (h). The results are set forth in Table 2.

Comparative Examples 1 to 4

Raw materials consisting of 10% by weight of (A) homopolypropylene (hPP) and 90% by weight of the propylene/ethylene/α-olefin copolymer (B-6, 7, 8 or 9) were kneaded by a labo-plastomill (manufactured by Toyo Seiki Co., Ltd.) at 190° C. and 40 rpm for 3 minutes to obtain a propylene-based polymer composition. The propylene-based polymer composition was evaluated by the aforesaid methods (a) to (h). The results are set forth in Table 2.

Reference Example 1

100% by weight of (A) homopolypropylene (hPP) was kneaded by a labo-platomill (manufactured by Toyo Seiki Co., Ltd.) at 210° C. and 40 rpm for 3 minutes to obtain a propylene-based polymer composition. The propylene-based polymer composition was evaluated by the aforesaid methods. The results are set forth in Table 3.

Example 11

Raw materials consisting of 80% by weight of (A) homopolypropylene (hPP) and 20% by weight of the propylene/ethylene/α-olefin copolymer (B-2) were kneaded by a labo-plastomill (manufactured by Toyo Seiki Co., Ltd.) at 210° C. and 40 rpm for 3 minutes to obtain a propylene-based polymer composition. The propylene-based polymer composition was evaluated by the aforesaid methods. The results are set forth in Table 3.

Example 12

Raw materials consisting of 50% by weight of (A) homopolypropylene (hPP) and 50% by weight of the propylene/ethylene/α-olefin copolymer (B-2) were kneaded by a labo-plastomill (manufactured by Toyo Seiki Co., Ltd.) at 210° C. and 40 rpm for 3 minutes to obtain a propylene-based polymer composition. The propylene-based polymer composition was evaluated by the aforesaid methods. The results are set forth in Table 3.

Comparative Example 11

Raw materials consisting of 80% by weight of (A) homopolypropylene (hPP) and 20% by weight of the propylene/ethylene/α-olefin copolymer (B-7) were kneaded by a labo-plastomill (manufactured by Toyo Seiki Co., Ltd.) at 210° C. and 40 rpm for 3 minutes to obtain a propylene-based polymer composition. The propylene-based polymer composition was evaluated by the aforesaid methods. The results are set forth in Table 3.

Comparative Example 12

Raw materials consisting of 80% by weight of (A) homopolypropylene (hPP) and 20% by weight of the propylene/ethylene/α-olefin copolymer (B-8) were kneaded by a labo-plastomill (manufactured by Toyo Seiki Co., Ltd.) at 210° C. and 40 rpm for 3 minutes to obtain a propylene-based polymer composition. The propylene-based polymer composition was evaluated by the aforesaid methods. The results are set forth in Table 3.

Comparative Example 13

Raw materials consisting of 50% by weight of (A) homopolypropylene (hPP) and 50% by weight of the propylene/ethylene/α-olefin copolymer (B-8) were kneaded by a labo-plastomill (manufactured by Toyo Seiki Co., Ltd.) at 210° C. and 40 rpm for 3 minutes to obtain a propylene-based polymer composition. The propylene-based polymer composition was evaluated by the aforesaid methods. The results are set forth in Table 3.

Examples 21 to 24

Raw materials consisting of 10% by weight of (A) homopolypropylene (hPP) and 90% by weight of the propylene/ethylene/α-olefin copolymer (B-10, 11, 12 or 13) were kneaded by a labo-plastomill (manufactured by Toyo Seiki Co., Ltd.) at 210° C. and 40 rpm for 3 minutes to obtain a propylene-based polymer composition.

Thereafter, an adhesive film using an adhesive was prepared by a method of co-extruding an adhesive layer composed of an adhesive containing the propylene-based polymer composition and a substrate layer using a T-die film method under the following conditions.

Extruder:

Adhesive layer: diameter=30 mm, L/D=26

Substrate layer: diameter=40 mm, L/D=26

Adhesive layer thickness/substrate layer thickness=10 μm/50 μm

Resin temperature: 230° C.

Chill roll temperature: 30° C.

Take-up rate: 10 m/min

Low-density polyethylene was used for the substrate layer.

The resulting adhesive film was evaluated by the aforesaid methods. The results are set forth in Table 5.

Examples 25 and 26

Raw materials consisting of 10% by weight of (A) homopolypropylene (hPP), 90% by weight of the propylene/ethylene/α-olefin copolymer (B-14 or 15) and 67 parts by weight or 233 parts by weight of a styrene-based elastomer (available from Asahi Kasei Corporation, Toughtec H1221 (trade name)) were kneaded by a labo-plastomill (manufactured by Toyo Seiki Co., Ltd.) at 210° C. and 40 rpm for 3 minutes to obtain a propylene-based polymer composition.

Thereafter, an adhesive film using an adhesive was prepared by a method of co-extruding an adhesive layer composed of an adhesive containing the propylene-based polymer composition and a substrate layer using a T-die film method under the same conditions as in Examples 21 to 24.

The resulting adhesive film was evaluated by the aforesaid methods. The results are set forth in Table 5.

Comparative Examples 21 and 22

Raw materials consisting of 10% by weight of (A) homopolypropylene (hPP) and 90% by weight of the propylene/ethylene/α-olefin copolymer (B-16 or 17) were kneaded by a labo-plastomill (manufactured by Toyo Seiki Co., Ltd.) at 210° C. and 40 rpm for 3 minutes to obtain a propylene-based polymer composition.

Thereafter, an adhesive film using an adhesive was prepared by a method of co-extruding an adhesive layer composed of an adhesive containing the propylene-based polymer composition and a substrate layer using a T-die film method under the same conditions as in Examples 21 to 24.

The resulting adhesive film was evaluated by the aforesaid methods. The results are set forth in Table 5.

TABLE 1

Properties of propylene/ethylene/α-olefin copolymer

|  |  | B-1 | B-2 | B-3 | B-4 | B-5 | B-6 | B-7 | B-8 | B-9 |
|---|---|---|---|---|---|---|---|---|---|---|
| Ethylene | mol % | 15.0 | 16.4 | 16.0 | 14.3 | 13.7 | 17.6 | 18.1 | 13.7 | 15.6 |
| Propylene | mol % | 78.3 | 77.7 | 76.6 | 79.9 | 79.4 | 77.5 | 75.6 | 67.0 | 74.1 |
| 1-Butene | mol % | 6.7 | 5.9 | 7.4 | 5.8 | 6.9 | 4.9 | 6.3 | 19.3 | 10.3 |
| B value |  | 1.0 | 1.0 | 1.0 | 1.0 | 1.0 | 1.0 | 1.0 | 1.0 | 1.0 |
| mm | % | 91.1 | 90.3 | 91.1 | 90.4 | 91.4 | 90.1 | 90.9 | 92.1 | 90.1 |
| Mw/Mn |  | 2.1 | 2.1 | 2.0 | 2.1 | 2.2 | 2.1 | 2.1 | 2.1 | 2.1 |
| Tm | ° C. | none | none | none | 61 | 59 | none | none | none | none |
| Tg | ° C. | −29 | −29 | −30 | −28 | −29 | −28 | −29 | −29 | −29 |
| Shore A hardness |  | 81 | 75 | 72 | 87 | 89 | 67 | 63 | 44 | 76 |
| MFR | g/10 min | 7.3 | 6.5 | 6.2 | 7.1 | 6.6 | 7.0 | 5.8 | 7.5 | 6.5 |

TABLE 2

Properties of propylene-based polymer composition

|  |  |  | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|---|---|
| (a) | TEM image |  | — | FIG. 1 | — | — | — | FIG. 2 | FIG. 3 | FIG. 4 | — |
| (b) | Shore A hardness |  | 87 | 82 | 82 | 91 | 93 | 80 | 78 | 68 | 84 |
| (c) | Internal haze | % | 6.5 | 4.9 | 4.6 | 9.5 | 17.0 | 19.0 | 21.0 | 6.5 | 7.5 |
| (c) | Total light transmittance | % | 95.5 | 97.0 | 97.5 | 96.5 | 93.0 | 79.0 | 81.0 | 97.5 | 97.0 |
| (d) | Strength at break | MPa | 21 | 18 | 18 | 21 | 22 | 19 | 19 | 11 | 20 |
| (d) | Elongation at break | % | 800< | 800< | 800< | 710 | 680 | 800< | 800< | 800< | 750 |
| (d) | Young's modulus | MPa | 31 | 23 | 25 | 71 | 79 | 19 | 17 | 11 | 42 |
| (e) | CS(23° C.) | % | 26 | 24 | 24 | 30 | 33 | 26 | 27 | 21 | 29 |
| (e) | CS(70° C.) | % | 76 | 75 | 75 | 79 | 78 | 71 | 73 | 66 | 69 |
| (f) | TMA softening temperature | ° C. | 105 | 107 | 105 | 104 | 106 | 106 | 107 | 106 | 104 |
| (g-1) | Presence of stickiness | organoleptic test | AA | AA | AA | AA | AA | AA | BB | BB | BB |
| (g-2) | Adhesive force | N/cm | 0.4 | 0.7 | 0.6 | 0.4 | 0.3 | 2.2 | 2.5 | 10< | 5.5 |
| (h) | Presence of tack at 40° C. | organoleptic test | AA | AA | AA | AA | AA | AA | BB | BB | AA |

TABLE 3

Properties of propylene-based polymer composition

|  |  | Ref. Ex. 1 | Ex. 11 | Ex. 12 | Comp. Ex. 11 | Comp. Ex. 12 | Comp. Ex. 13 |
|---|---|---|---|---|---|---|---|
| Homopolypropylene |  | 100 | 80 | 50 | 50 | 80 | 50 |
| Propylene/ethylene/ | B-2 |  | 20 | 50 |  |  |  |

TABLE 3-continued

Properties of propylene-based polymer composition

Figure 5:
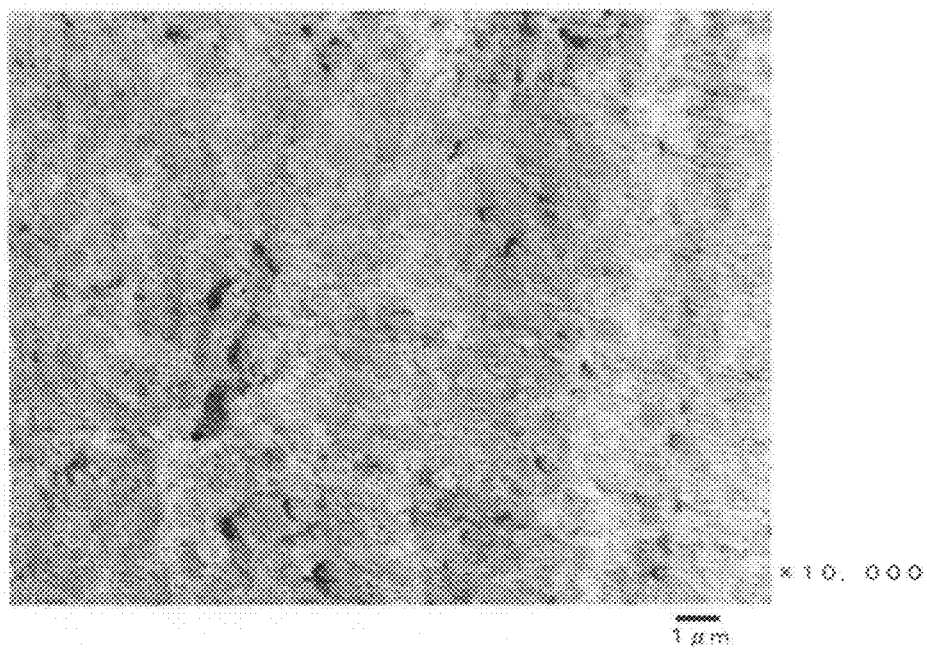
FIG. 5 shows a TEM image obtained by magnifying a propylene-based polymer composition described in Example 11 10000 times with TEM.
Figure 6:
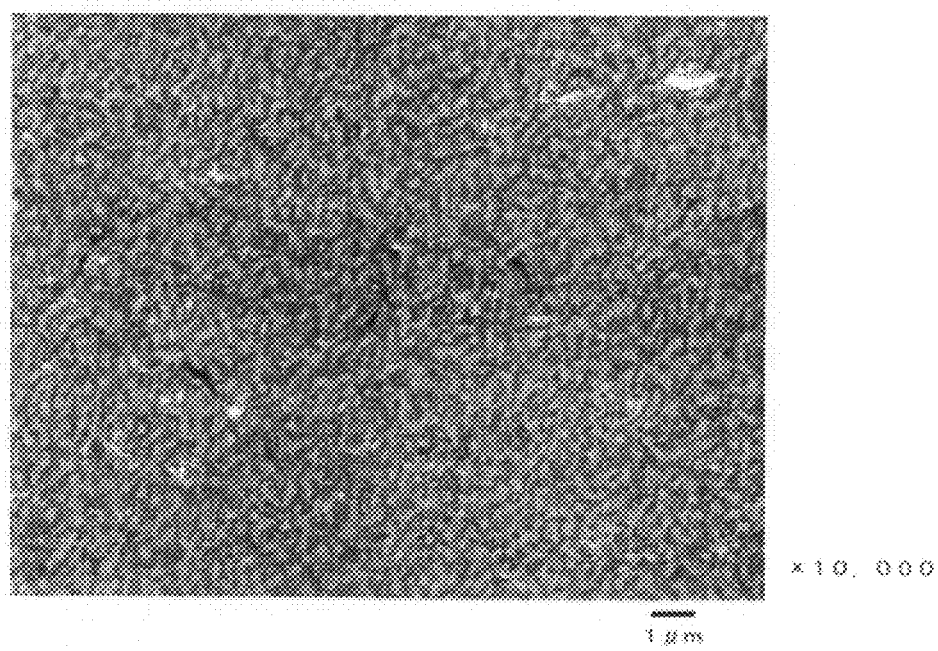
FIG. 6 shows a TEM image obtained by magnifying a propylene-based polymer composition described in Example 12 10000 times with TEM.

|  |  | Ref. Ex. 1 | Ex. 11 | Ex. 12 | Comp. Ex. 11 | Comp. Ex. 12 | Comp. Ex. 13 |
|---|---|---|---|---|---|---|---|
| α-olefin copolymer | B-7 |  |  |  | 50 |  |  |
|  | B-8 |  |  |  |  | 20 | 50 |
| TEM image |  | — | FIG. 5 | FIG. 6 | FIG. 7 | FIG. 8 | — |
| Internal haze | % | 84.5 | 81.4 | 70.3 | 89.8 | 80.3 | 68.7 |
| Total light transmittance | % | 82.5 | 90.5 | 91.5 | 66.5 | 90.5 | 92.0 |
| Yield stress | MPa | 37 | 30 | 17 | 17 | 29 | 17 |
| Strength at break | MPa | — | 18 | 29 | 19 | 19 | 22 |
| Elongation at break | % | <10 | 220 | 560 | 330 | 380 | 420 |
| Young's modulus | MPa | 1980 | 1190 | 490 | 460 | 1020 | 400 |
| Whitening resistance | organoleptic test | BB | AA | AA | CC | AA | AA |
| Presence of stickiness | organoleptic test | AA | AA | BB | AA | BB | CC |

TABLE 4

Properties of propylene/ethylene/α-olefin copolymer

|  |  | B-10 | B-11 | B-12 | B-13 | B-14 | B-15 | B-16 | B-17 |
|---|---|---|---|---|---|---|---|---|---|
| Ethylene | mol % | 10.9 | 12.5 | 13.5 | 16.1 | 12.5 | 16.1 | 13.7 | 15.6 |
| Propylene | mol % | 82.8 | 81.2 | 80.4 | 77.9 | 81.2 | 77.9 | 67.0 | 74.1 |
| 1-Butene | mol % | 6.3 | 6.3 | 6.1 | 6.0 | 6.3 | 6.0 | 19.3 | 10.3 |
| mm | % | 91.0 | 91.3 | 91.4 | 91.1 | 91.3 | 91.1 | 1.0 | 1.0 |
| Mw/Mn |  | 2.1 | 2.1 | 2.2 | 2.0 | 2.1 | 2.0 | 2.1 | 2.1 |
| Tm | °C. | 69.0 | 56.0 | 59.0 | none | 56.0 | none | none | none |
| Shore A hardness |  | 93 | 90 | 87 | 78 | 90 | 78 | 44 | 76 |

TABLE 5

Properties of propylene-based polymer composition

|  |  | Ex. 21 | Ex. 22 | Ex. 23 | Ex. 24 | Ex. 25 | Ex. 26 | Comp. Ex. 21 | Comp. Ex. 22 |
|---|---|---|---|---|---|---|---|---|---|
| Propylene/ethylene/α-olefin copolymer | wt % | B-10 90 | B-11 90 | B-12 90 | B-13 90 | B-14 90 | B-15 90 | B-16 90 | B-17 90 |
| Homopolypropylene | wt % | 10 | 10 | 10 | 10 | 10 | 10 | 10 | 10 |
| Styrene-based elastomer | part(s) by weight | — | — | — | — | 67 | 233 | — | — |
| Adhesive force to adherend (23° C.) | N/25 mm | 0.04 | 0.09 | 0.15 | 0.41 | 0.6 | 3.3 | 1.5 | 1.0 |
| Adhesive force to adherend (60° C.) | N/25 mm | 0.05 | 0.19 | 0.46 | 1.2 | 4.7 | 5.6 | 5.0 | 3.0 |
| Staining on adherend (40° C.) |  | AA | AA | AA | AA | AA | AA | CC | BB |
| Staining on adherend (60° C.) |  | AA | AA | AA | BB | AA | AA | CC | CC |

The propylene-based polymer compositions obtained in Examples 1 to 4 had excellent mechanical properties, transparency, flexibility and rubber elasticity, and in addition, stickiness did not occur after heat treatment. It was also confirmed that the propylene-based polymer compositions of Examples 2 and 3 among them were excellent in balance between flexibility and other properties.

On the other hand, in the elastomer obtained in Comparative Example 1, lowering of flexibility and a little lowering of transparency were confirmed.

Figure 2:
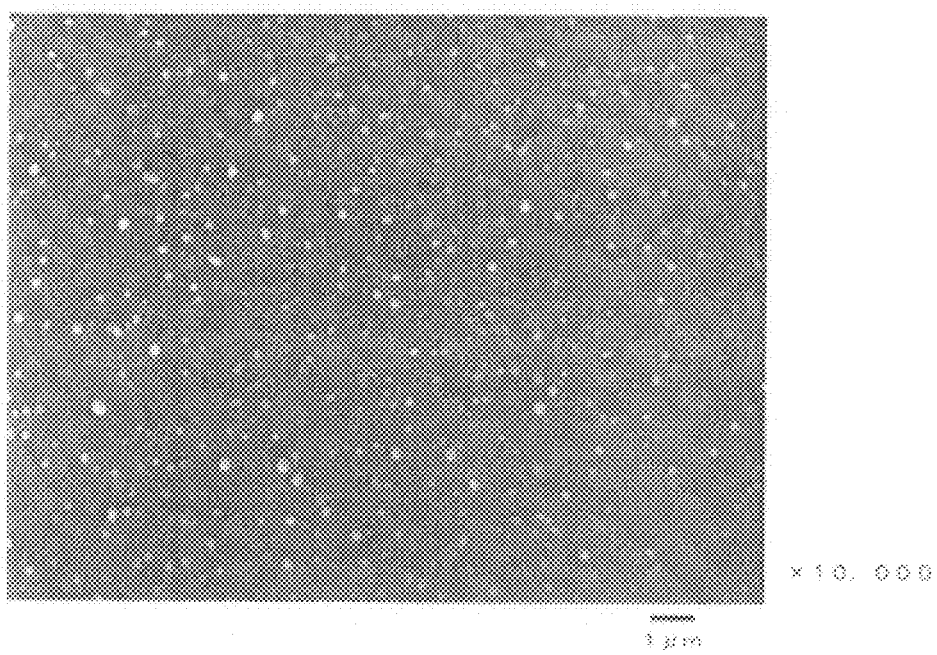
FIG. 2 shows a TEM image obtained by magnifying a propylene-based polymer composition described in Comparative Example 2 10000 times with TEM.
Figure 3:
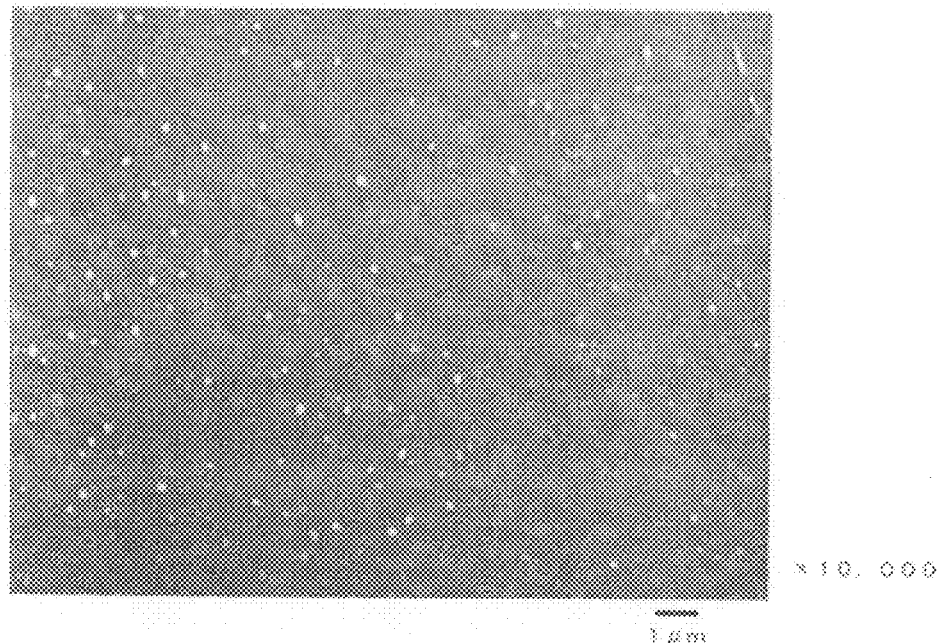
FIG. 3 shows a TEM image obtained by magnifying a propylene-based polymer composition described in Comparative Example 3 10000 times with TEM.
Figure 4:
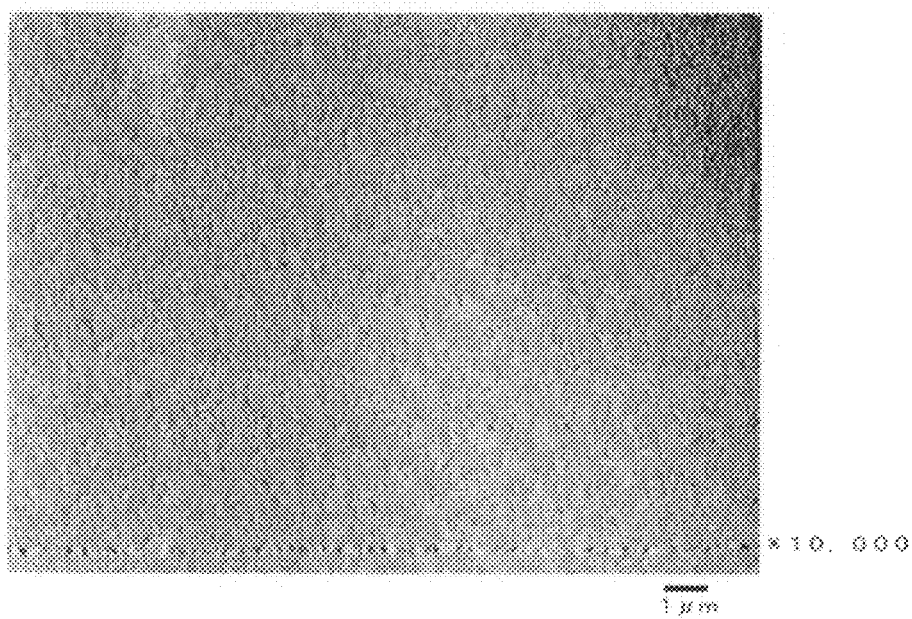
FIG. 4 shows a TEM image obtained by magnifying a propylene-based polymer composition described in Comparative Example 4 10000 times with TEM.

In the elastomers obtained in Comparative Examples 2 and 3, transparency was markedly lowered. The reason is considered to be that phase separation took place between the homopolpropylene (hPP, white spherical domains in the photograph) and the propylene/ethylene/α-olefin copolymer (dark color matrix in the photograph), as observed in the TEM photographs (FIG. 2, FIG. 3).

In the elastomer obtained in Comparative Example 4, stickiness occurred after heat treatment though the elastomer exhibited excellent mechanical properties, transparency, flexibility and rubber elasticity.

The propylene-based polymer compositions obtained in Examples 11 and 12 had excellent transparency and whitening resistance, and in addition, stickiness did not occur after heat treatment. It was confirmed that Example 11 among them had extremely low degree of stickiness after heat treatment and was excellent.

Figure 7:
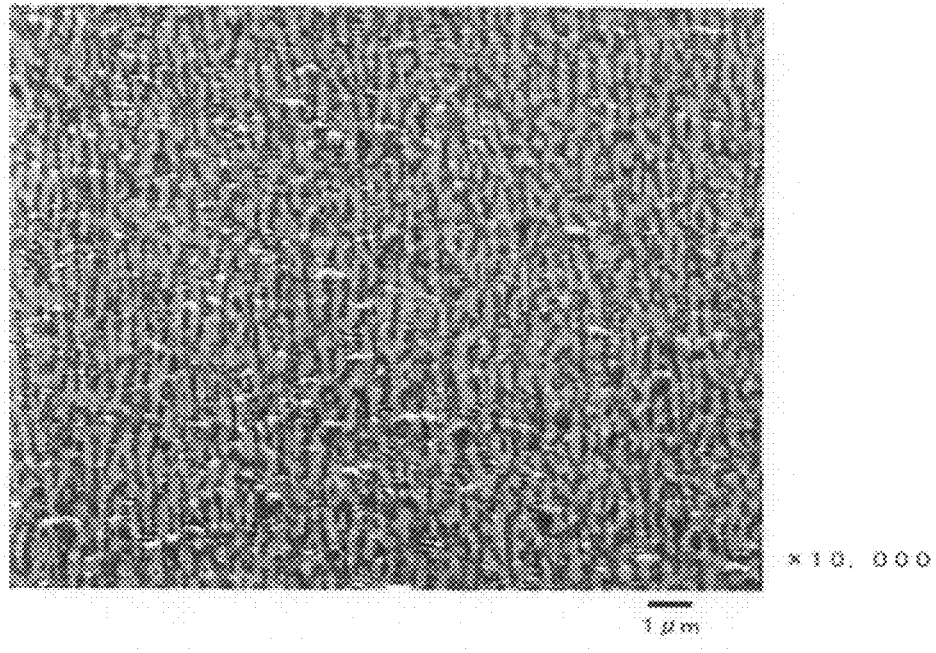
FIG. 7 shows a TEM image obtained by magnifying a propylene-based polymer composition described in Comparative Example 11 10000 times with TEM.
Figure 8:
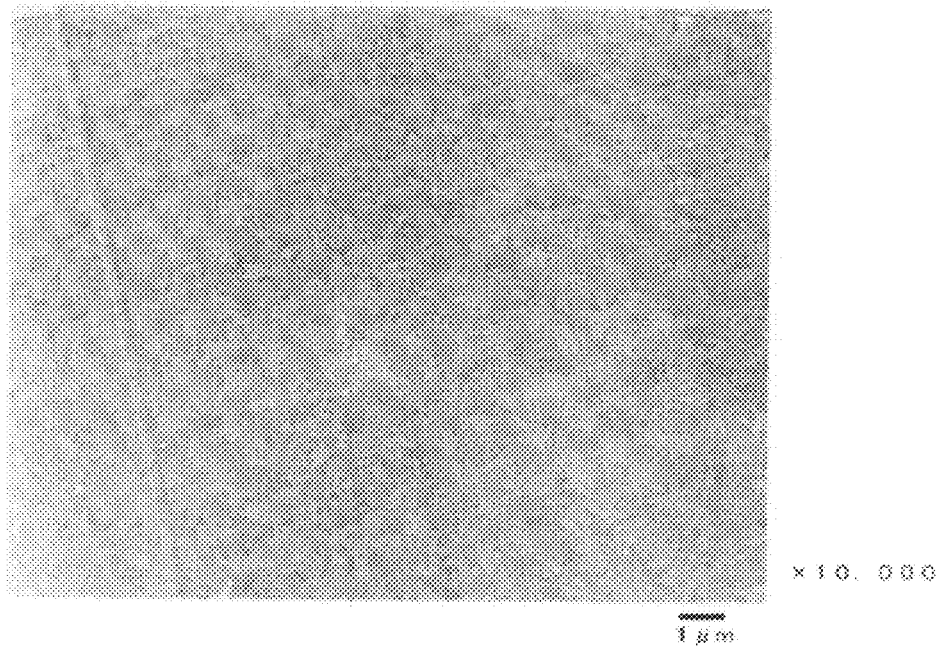
FIG. 8 shows a TEM image obtained by magnifying a propylene-based polymer composition described in Comparative Example 12 10000 times with TEM.

In contrast with them, lowering of transparency and deterioration of whitening resistance were confirmed in Comparative Example 11. The cause for them is considered to be that phase separation took place between the homopolypropylene (hPP, light color domains in the photograph) and the propylene/ethylene/α-olefin copolymer (dark color domains in the photograph), as observed in the TEM photograph (FIG. 7).

In Comparative Examples 12 and 13, stickiness occurred after heat treatment.

Measurement of TmB (1st Run) of propylene-based Polymer Composition by Differential Scanning Calorimeter (DSC)

Example 31

Using the sample having been subjected to the treatment at 80° C. for 1 week in the evaluation of (g) Heat resistance (stickiness test in atmosphere of room temperature after long time heat treatment) of Example 2 and the sample having been subjected to the treatment at 40° C. for 1 week in the evaluation of (h) Heat resistance (tack test at high temperature after long time heat treatment), the aforesaid (i) Measurement of TmB (1st Run) by differential scanning calorimeter (DSC) was carried out, and the measured values were compared with TmB in the case where the heat treatment was not carried out (sample used in the TEM image observation of Example 2). The results are shown in FIG. 9.

Comparative Example 31

Using the sample having been subjected to the treatment at 80° C. for 1 week in the evaluation of (g) Heat resistance (stickiness test in atmosphere of room temperature after long time heat treatment) of Comparative Example 4 and the sample having been subjected to the treatment at 40° C. for 1 week in the evaluation of (h) Heat resistance (tack test at high temperature after long time heat treatment), the aforesaid (i) Measurement of TmB (1st Run) by differential scanning calorimeter (DSC) was carried out, and the measured values were compared with TmB in the case where the heat treatment was not carried out (sample used in the TEM image observation of Comparative Example 4). The results are shown in FIG. 10.

Figure 9:
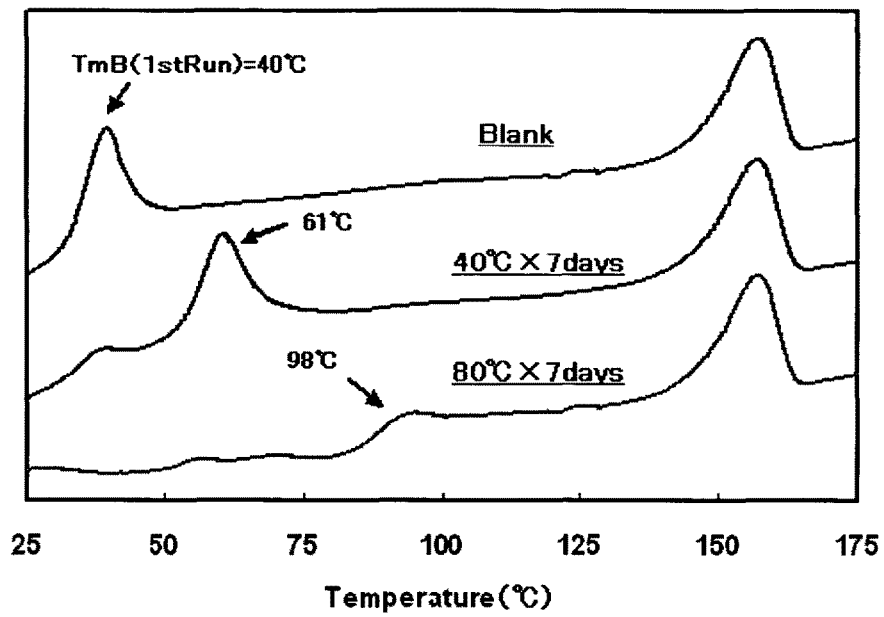
FIG. 9 shows dependence of a DSC curve of a propylene-based polymer composition described in Example 31 on the heat treatment temperature.

In Example 31, a phenomenon that TmB (1st Run) is shifted to the higher temperature side by carrying out the heat treatment was clearly confirmed, as shown in FIG. 9. That is to say, this means that the heat resistance of the propylene-based polymer composition is greatly improved by the heat treatment, and this phenomenon is considered to be the reason why excellent performance was exhibited in the aforesaid evaluation of (h) Heat resistance (tack test at high temperature after long time heat treatment) of Example 2.

Figure 10:
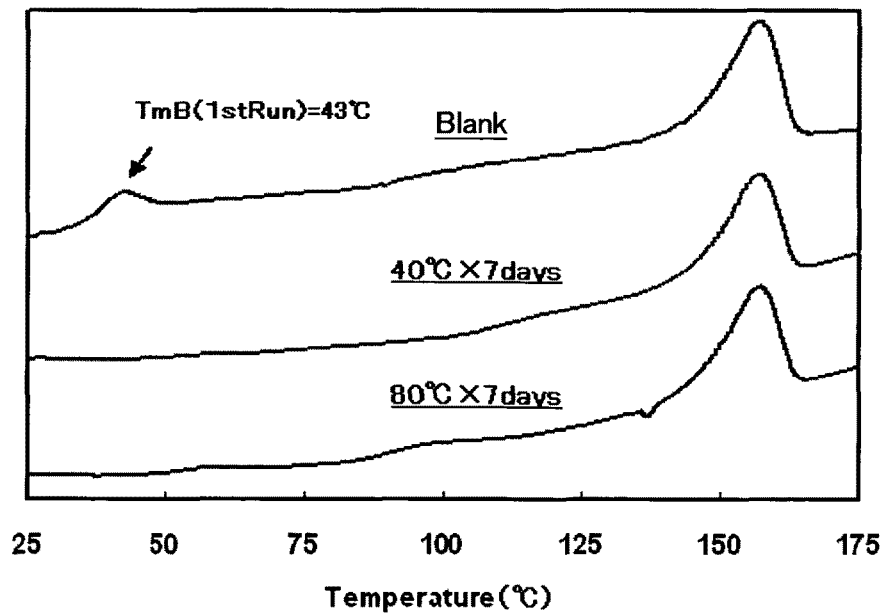
FIG. 10 shows dependence of a DSC curve of a propylene-based polymer composition described in Comparative Example 31 on the heat treatment temperature.

On the other hand, in Comparative Example 31, a phenomenon that TmB (1st Run) disappears (becomes unclear) by carrying out the heat treatment was confirmed, as shown in FIG. 10. It is thought that this suggests that the crystal structure attributable to the propylene/ethylene/α-olefin copolymer (B) disappeared because of the heat treatment, and the cause of stickiness after heat treatment observed in the aforesaid evaluation of (g-1) Presence of stickiness of Comparative Example 4 is considered to be that a part of the propylene/ethylene/α-olefin copolymer (B) melted by the heat treatment was deposited on the surface by bleed-out.

The invention claimed is:

1. An adhesive comprising a propylene-based polymer composition (X1) comprising:
   (A) a propylene-based polymer (PP) satisfying the following requirements (1) and (2), in an amount of 1 to 30 parts by weight, and
   (B) a propylene/ethylene/α-olefin copolymer satisfying the following requirements (I) to (III), in an amount of 70 to 99 parts by weight,
   with the proviso that the total amount of the component (A) and the component (B) is 100 parts by weight,
   (1) the polymer (A) has a melting point (Tm), as measured by a differential scanning calorimeter (DSC), of not lower than 110° C. but not higher than 170° C.,
   (2) the polymer (A) has an isotactic pentad fraction (mmmm fraction) of not less than 90%,
   (I) the copolymer (B) constitutional units derived from propylene in amounts of 73.1 to 83.0% by mol, constitutional units derived from ethylene in amounts of 14.0 to 16.9% by mol and constitutional units derived from an α-olefin of 4 to 20 carbon atoms in amounts of 3.0 to 10.0% by mol,
   (II) the copolymer (B) has an isotactic triad fraction (mm), as calculated by $^{13}$C-NMR, of not less than 85%, and
   (III) the copolymer (B) has a molecular weight distribution (Mw/Mn, Mw: weight-average molecular weight, Mn: number-average molecular weight, both being in terms of polystyrene), as measured by gel permeation chromatography (GPC), of not more than 3.5.

2. The adhesive as claimed in claim 1, wherein the propylene/ethylene/α-olefin copolymer (B) is a copolymer which has a melting point (Tm), as measured by a differential scanning calorimeter (DSC), of lower than 65° C. or whose melting point (Tm) is not observed.

3. The adhesive as claimed in claim 1 wherein the propylene-based polymer composition (X1) is a pressed sheet specimen having a thickness of 2 mm obtained from the propylene-based polymer composition (X1) that has an internal haze of less than 15%.

4. The adhesive as claimed in claim 1, wherein the propylene-based polymer composition (X1) has a Shore A hardness, as measured in accordance with ASTM D2240, of 70 to 92.

5. The adhesive as claimed in claim 1, wherein the propylene-based polymer composition (X1) has a property that when a slice obtained from a core portion of a sheet having a thickness of 2 mm obtained by press molding the propylene-based polymer composition (X1) is dyed with ruthenic acid and observed by a transmission electron microscope (TEM), a phase separation structure is not observed.

6. The adhesive as claimed in claim 1, wherein the propylene-based polymer composition (X1) comprises one or more elastomers selected torn the group consisting of a styrene/diene-based copolymer, a hydrogenation product thereof and a styrene/isobutylene copolymer, which have been added in amounts of 5 to 400 parts by weight based on 100 parts by weight of the propylene-based polymer composition (X1).

7. A protective film comprising a substrate containing at least one resin selected from the group consisting of polypropylene and polyethylene and an adhesive layer which contains the adhesive as claimed in claim 1 and is laminated on the substrate.

8. A sheet for keypad, comprising the propylene-based polymer composition as claimed in claim 1.

9. An adhesive comprising a propylene-based polymer composition (X3) comprising:
   (A) a propylene-based polymer (PP) satisfying the following requirements (1) and (2), in an amount of 1 to 30 parts by weight, and
   (B) a propylene/ethylene/α-olefin copolymer satisfying the following requirements (I) to (III), in an amount of 70 to 99 parts by weight, with the proviso that the total amount of the component (A) and the component (B) is 100 parts by weight, (1) the polymer (A) has a melting point (Tm), as measured by a differential scanning calorimeter (DSC), of not lower than 110° C. but not higher than 170° C., (2) the polymer (A) has an isotactic pentad fraction (mmmm fraction) of not less than 90%, (I) the copolymer (B) contains constitutional units derived from propylene in amounts of 760 to 87.0% by mol, constitutional units derived from ethylene in amounts of 10.0 to 14.0% by mol and constitutional units derived from an α-olefin of 4 to 20 carbon atoms in amounts of 3.0 to 10.0% by mol, (II) the copolymer (B) has an isotactic triad fraction (mm), as calculated by $^{13}$C-NMR, of not less than 85%, and (III) the copolymer (B) has a molecular weight distribution (Mw/Mn, Mw: weight-average molecular weight, Mn: number-average molecular weight, both being in terms of polystyrene), as measured by gel permeation chromatography (GPC), of not more than 3.5.

10. The adhesive as claimed in claim 9, wherein the propylene/ethylene/α-olefin copolymer (B) has a melting point (Tm), as measured by a differential scanning calorimeter (DSC), of lower than 80° C.

11. The adhesive as claimed in claim 9, wherein the propylene-based polymer composition (X3) comprises one or more elastomers selected from the group consisting of a styrene/diene-based copolymer, a hydrogenation product thereof and a styrene/isobutylene copolymer, which have been added in amounts of 5 to 400 parts by weight based on 100 parts by weight of the propylene-based polymer composition (X3).

12. A protective film comprising a substrate containing at least one resin selected from the group consisting of polypropylene and polyethylene and an adhesive layer which contains the adhesive as claimed in claim 9, and is laminated on the substrate.

13. A sheet for keypad, comprising the propylene-based polymer composition as claimed in claim 9.

14. The adhesive as claimed in claim 9, wherein the propylene/ethylene/α-olefin copolymer (B) has a Shore A hardness, as measured in accordance with ASTM 92240, of 83 to 98.

15. The adhesive as claimed in claim 9, wherein the propylene/ethylene/α-olefin copolymer (B) has a Shore A hardness, as measured in accordance with ASTM 92240, of 88 to 98.

* * * * *